(12) United States Patent
Kishikawa et al.

(10) Patent No.: US 11,546,298 B2
(45) Date of Patent: *Jan. 3, 2023

(54) INFORMATION PROCESSING METHOD, INFORMATION PROCESSING SYSTEM, AND NON-TRANSITORY COMPUTER-READABLE RECORDING MEDIUM STORING A PROGRAM

(71) Applicant: PANASONIC INTELLECTUAL PROPERTY CORPORATION OF AMERICA, Torrance, CA (US)

(72) Inventors: Takeshi Kishikawa, Osaka (JP); Manabu Maeda, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/223,772

(22) Filed: Apr. 6, 2021

(65) Prior Publication Data

US 2021/0226919 A1 Jul. 22, 2021

Related U.S. Application Data

(63) Continuation of application No. 16/229,528, filed on Dec. 21, 2018, now Pat. No. 10,999,248, which is a
(Continued)

(30) Foreign Application Priority Data

Dec. 6, 2016 (JP) .............................. JP2016-237049
Oct. 31, 2017 (JP) .............................. JP2017-209871

(51) Int. Cl.
*H04L 9/40* (2022.01)
*H04L 12/40* (2006.01)
(Continued)

(52) U.S. Cl.
CPC ........ *H04L 63/0245* (2013.01); *G06F 21/645* (2013.01); *H04L 12/28* (2013.01);
(Continued)

(58) Field of Classification Search
CPC ............. H04L 63/0245; H04L 63/1425; H04L 63/1466; H04L 63/0281; H04L 12/28;
(Continued)

(56) References Cited

U.S. PATENT DOCUMENTS

2014/0328352 A1    11/2014  Mabuchi et al.
2017/0048241 A1*   2/2017   Tanabe ..................... H04L 9/32
2017/0058241 A1    3/2017   Roleder

OTHER PUBLICATIONS

International Search Report of PCT application No. PCT/JP2017/040866 dated Dec. 26, 2017.
(Continued)

*Primary Examiner* — Michael S McNally
(74) *Attorney, Agent, or Firm* — Greenblum & Bernstein, P.L.C.

(57) ABSTRACT

An information processing method of processing data frames flowing over an onboard network includes a frame collecting step of obtaining, from each of received data frames, a payload included in the data frame and configured of at least one field, and recording in a reception log as one record, and a field extracting step of calculating, regarding each of a plurality of payload splitting pattern candidates indicating different regions within payloads of the plurality of data frames, one or more features relating to time-sequence change of values of the payload in the region, from the plurality of records, selecting a payload splitting pattern indicating a region of a field within the payload, based on the features, and outputting field extracting results indicating the region indicated by the selected payload splitting pattern candidate, and a category of the field based on the features.

11 Claims, 25 Drawing Sheets

Related U.S. Application Data continuation of application No. PCT/JP2017/040866, filed on Nov. 14, 2017.

(51) Int. Cl.
  *G06F 21/64* (2013.01)
  *H04L 12/28* (2006.01)
  *H04W 4/48* (2018.01)

(52) U.S. Cl.
  CPC .......... *H04L 12/40* (2013.01); *H04L 63/1425* (2013.01); *H04L 63/1466* (2013.01); *H04L 63/0281* (2013.01); *H04L 2012/40215* (2013.01); *H04W 4/48* (2018.02)

(58) Field of Classification Search
  CPC ........... H04L 12/40; H04L 2012/40215; G06F 21/645; H04W 4/48
  USPC ........................................................ 713/189
  See application file for complete search history.

(56) References Cited

OTHER PUBLICATIONS

Moti Markovitz et al., "Field Classification, Modeling and Anomaly Detection in Unknown CAN Bus Networks", Embedded Security in Cars, Oct. 13, 2015.

Andreas Theissler et al., "Detecting anomalies in recordings from test drives based on a training set of normal instances", IADIS ISA and ECDM 2012, Jul. 2012.

Tomoyuki Haga et al., "Proposal of Statistical Anomaly Detection System for In-Vehicle Network using Cloud", SCIS 2016, Jan. 19, 2016.

\* cited by examiner

FIG. 5

| MODE | COLLECTION MODE |
|---|---|

FIG. 6

| RECEPTION TIME (ms) | ID | DATA FIELD (hex) |
|---|---|---|
| 51 | 0x100 | 00 00 00 10 10 |
| 99 | 0x100 | 01 00 00 10 11 |
| 150 | 0x100 | 02 00 00 10 12 |
| ⋮ | | |
| 500450 | 0x100 | 26 15 4B 30 B6 |

FIG. 7

| ID | RECEPTION INTERVAL (ms) | | INFORMATION RELATING TO DATA FIELD | | | |
|---|---|---|---|---|---|---|
| | AVERAGE | VARIANCE | START | LENGTH | CATEGORY | BEHAVIOR INFORMATION |
| 0x100 | 50 | 3 | 1 | 8 | COUNTER | — |
| | | | 9 | 2 | CONSTANT VALUE | 0 |
| | | | 11 | 14 | CONTINUOUS VALUE | 10 (AVERAGE OF AMOUNT OF CHANGE) 100 (VARIANCE OF AMOUNT OF CHANGE) |
| | | | 25 | 1 | CONSTANT VALUE | 0 |
| | | | 26 | 3 | STATUS | 0.0001 (OCCURRENCE FREQUENCY OF CHANGE) |
| | | | 29 | 4 | CONSTANT VALUE | 0 |
| | | | 33 | 8 | CHECKSUM | — |

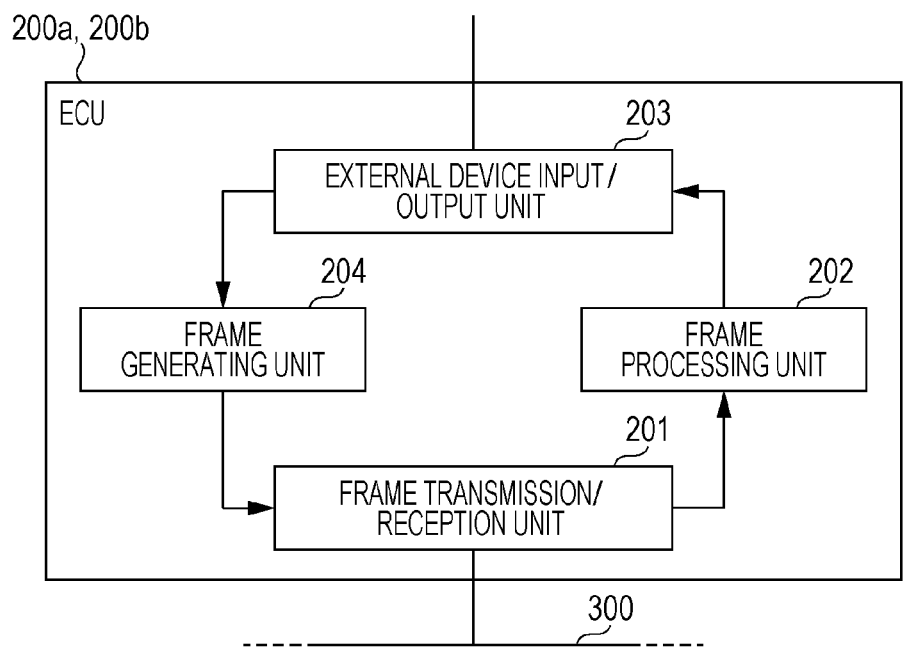

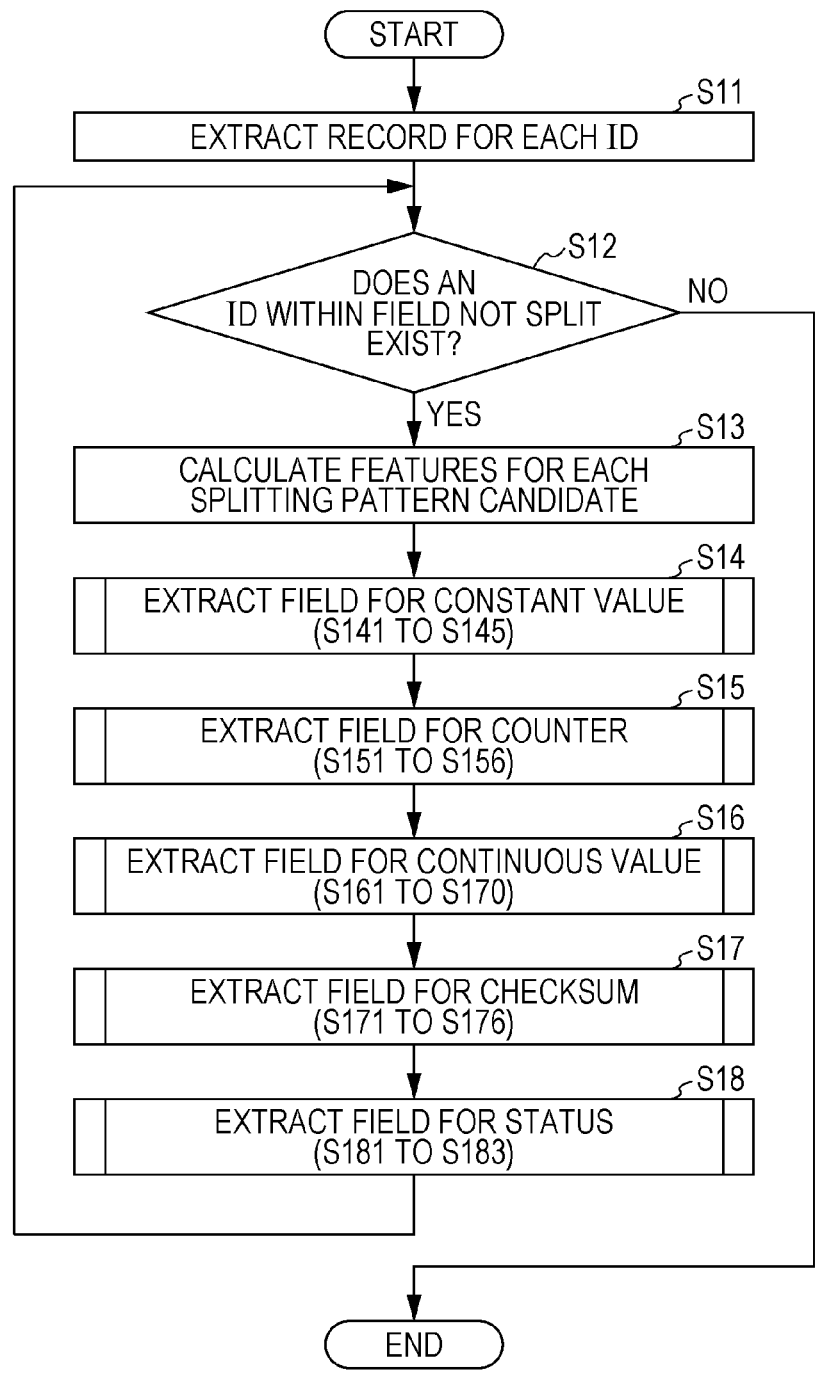

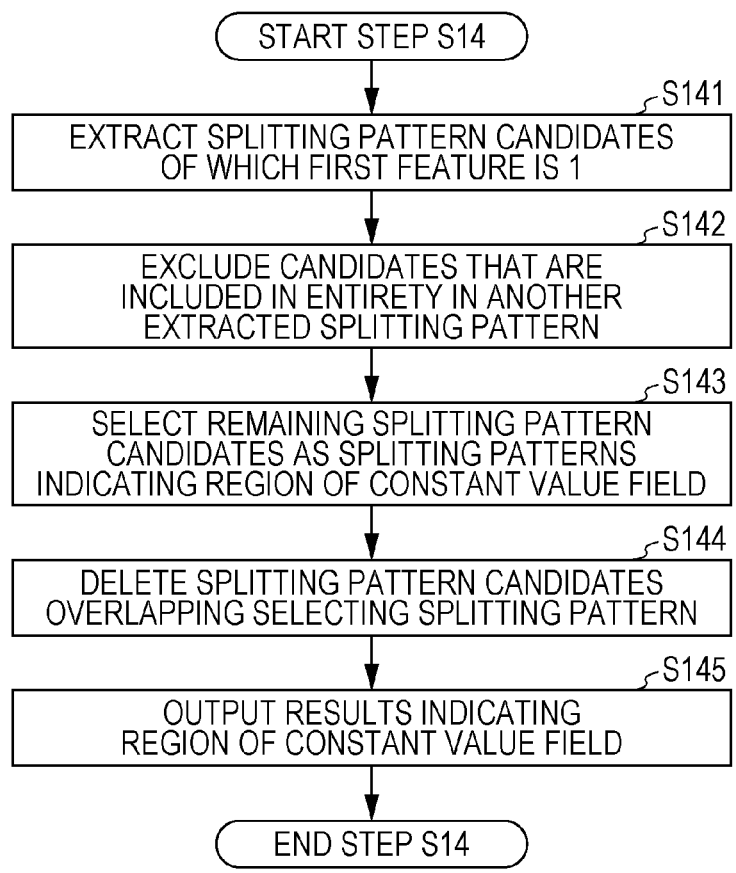

FIG. 14

| Length / Index | 1 | 2 | 3 | 4 | ... | 30 | ... | 39 | 40 |
|---|---|---|---|---|---|---|---|---|---|
| 1 | 2,0.025,1 | 4,0.1,1 | | ... | | 5,0.125,2 | ... | 2,0.025,1 | 2,0.025,1 |
| 2 | 2,0.025,1 | | | | | 5,0.125,3 | ... | 2,0.025,1 | |
| ... | | | | | ... | | | | |
| 29 | 1,0,0 | 1,0,0 | 1,0,0 | 1,0,0 | | | | | |
| 30 | 1,0,0 | 1,0,0 | 1,0,0 | 4,0.2,2 | | | | | |
| 31 | 1,0,0 | 1,0,0 | | | | | | | |
| 32 | 1,0,0 | 2,0.025,1 | | | | | | | |
| ... | | | | | ... | | | | |
| 40 | 2,0.025,1 | | | | | | | | |

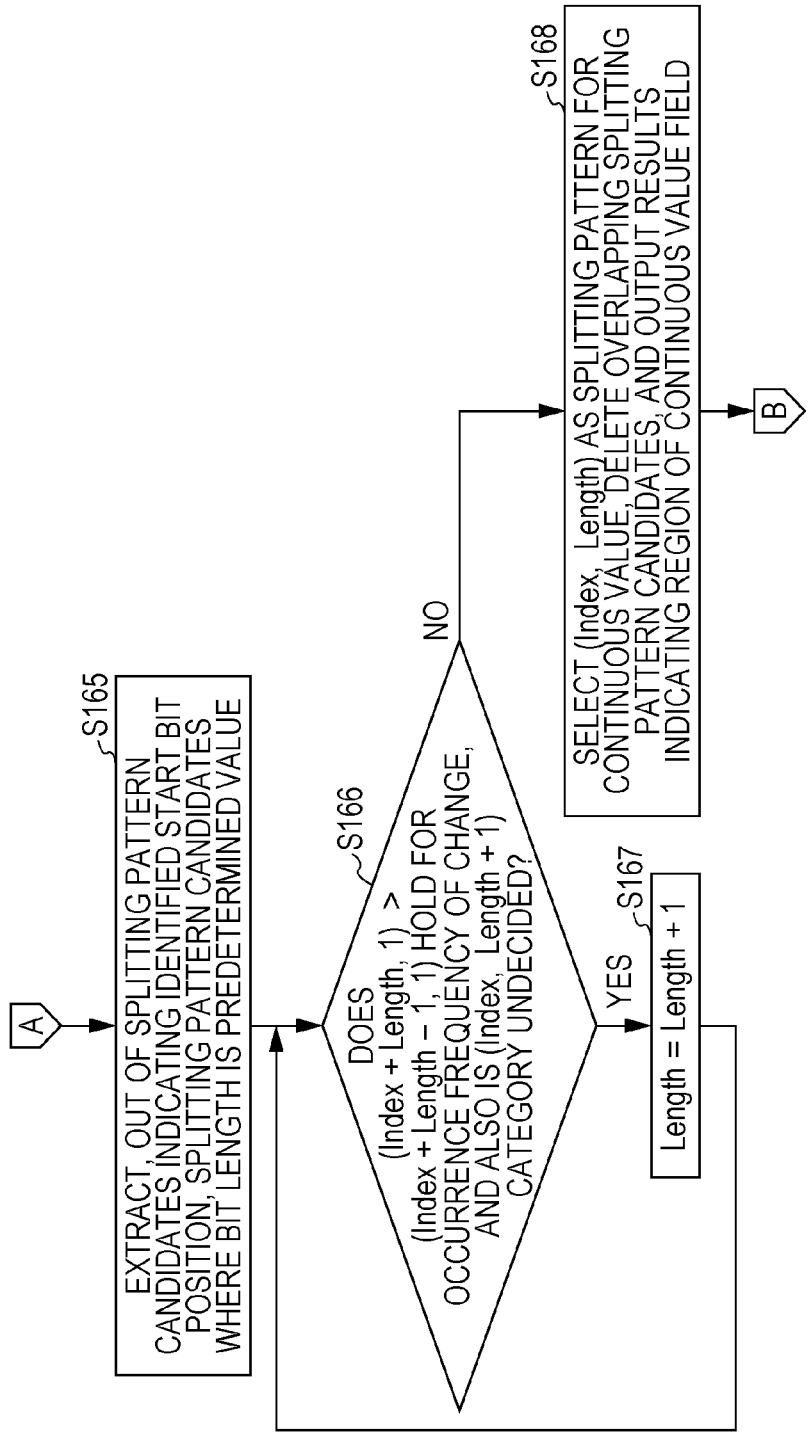

FIG. 18A

| Index \ Length | 1 | 2 | ... | 8 | ... | 13 | 14 | ... |
|---|---|---|---|---|---|---|---|---|
| ... | | | | | | | | |
| 11 | 1 | 1 | ... | 10 | ... | 100 | 100 | ... |
| 12 | 1 | 2 | ... | 15 | ... | 150 | ✕ | ... |
| ... | | | ... | | | | | |
| 23 | 1 | 2 | ... | ✕ | ... | ✕ | ✕ | ... |
| 24 | 1 | ✕ | ... | ✕ | ... | ✕ | ✕ | ... |
| ... | | | | | | | | |
| AVERAGE OF VARIANCE IN AMOUNT OF CHANGE | 1 | 1 | ... | 80 | ... | 125 | 100 | ... |

FIG. 18B

| Index \ Length | 1 | 2 | ... | 8 | ... | 13 | 14 | ... | AVERAGE SCORE |
|---|---|---|---|---|---|---|---|---|---|
| ... | | | | | | | | | ... |
| 11 | 0 | 1 | ... | 4 | ... | 2 | | ... | 4 |
| 12 | 0 | 1 | ... | 3 | ... | 2 | | ... | 2 |
| ... | | | | | | | | | ... |
| 23 | 0 | 0 | ... | | ... | | | ... | 0 |
| 24 | 0 | | ... | | ... | | | ... | 0 |
| ... | | | | | | | | | ... |

| Index \ Length | 1 |
|---|---|
| ⋮ | ⋮ |
| 15 | 0.25 |
| 16 | 0.28 |
| ⋮ | ⋮ |
| 24 | 0.40 |
| 25 | 0 |
| ⋮ | ⋮ |

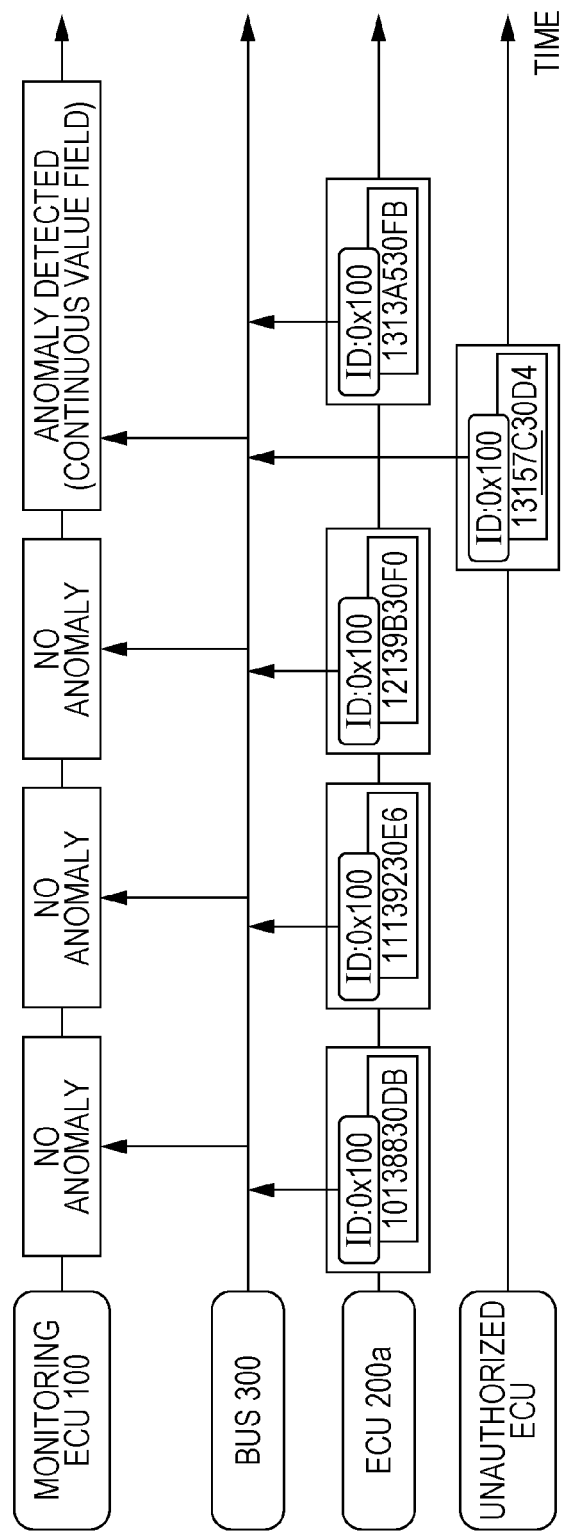

INFORMATION PROCESSING METHOD, INFORMATION PROCESSING SYSTEM, AND NON-TRANSITORY COMPUTER-READABLE RECORDING MEDIUM STORING A PROGRAM

CROSS-REFERENCE TO RELATED APPLICATIONS

This is a continuation of U.S. patent application Ser. No. 16/229,528, filed Dec. 21, 2018, which is a continuation of Int'l Pat. Appl. No. PCT/JP2017/040866, filed Nov. 14, 2017, which claims priority to Jap. Pat. Appl. Nos. 2017-209871, filed Oct. 31, 2017, and 2016-237049, filed Dec. 6, 2016. The disclosure of each of the above-noted documents is expressly incorporated herein by reference in its entirety.

BACKGROUND

1. Technical Field

The present disclosure relates to information processing of data flowing over an onboard network.

2. Description of the Related Art

In recent years, a great number of devices called electronic control units (hereinafter, ECU) have been placed in systems in automobiles. A network connecting these ECUs is referred to as an onboard network. Many standards exist for onboard networks. One of the most mainstream of these onboard networks is a standard called Controller Area Network (hereinafter, CAN).

A two-line bus is used in a CAN communication network, and each ECU connected to the bus is called a node. Each node connected to a bus transmits/receives messages called frames. A transmitting node that transmits a frame applies voltage to the two busses, and transmits a value "1" called recessive, and a value "0" called dominant depending on whether there is or not potential difference between the busses, thereby transmitting binary data of the frame. In a case where multiple transmitting nodes transmit recessive and dominant at exactly the same timing, the dominant is transmitted with priority.

In a case where there is an anomaly in the format of a received frame, a receiving node transmits a frame called an error frame. An error frame is a frame starting with six continuous bits dominant for example, and a transmitting node and other receiving nodes that receive this frame detect that an error has occurred.

No identifiers indicating the transmission destination or transmission source exist in CAN, with the transmitting node attaching an ID, indicating the type and so forth of the data, to each frame and transmitting, and the receiving nodes only receiving frames of a predetermined ID. The CSMA/CA (Carrier Sense Multiple Access with Collision Avoidance) format is employed in CAN, so when multiple nodes transmit at the same time, arbitration by message ID is performed, with frames having a smaller message ID value being transmitted with higher priority.

On the other hand, there is a threat to onboard CAN network systems in that an attacker might unauthorizedly control an ECU by accessing the bus and transmitting unauthorized frames, and security measures are being studied. For example, Japanese Patent No. 5664799 discloses an onboard network monitoring device. A method is disclosed in Japanese Patent No. 5664799 where whether or not frames are transmitted to a network at communication intervals stipulated beforehand, and anomalous frames deviating from the stipulated communication intervals are judged to be unauthorized, thereby preventing control by unauthorized frames. However, in order to detect unauthorized frames with higher precision, there is the need to verify the contents of the payloads contained in the frames.

However, specifications for frames exchanged in general over an onboard network are not standardized, and automakers each have their own unique designs, so a third party cannot know delimiters for multiple meaningful units in the payload. If the type of data included in a payload is unknown, verifying the payload to detect unauthorized frames is difficult. Further, even the same automaker may change frame specifications depending on the model and year of automobiles, so constructing a system that would verify frames into to design a monitoring device for each automobile would require a vast amount of work.

A method of splitting payloads included in frames collected only from observation data into meaningful units, and creating a whitelist for each portion of the payloads obtained by splitting, is disclosed in "M. Markovitz, A. Wool, 'Field Classification, Modeling and Anomaly Detection in Unknown CAN Bus Network', Embedded Security in CARs, 2015" (hereinafter "Markovitz et al.").

SUMMARY

In one general aspect, the techniques disclosed here feature an information processing method of processing data frames flowing over an onboard network including one or more electronic control units that is carried out by an information processing system having a storage unit. The information processing method includes: frame collecting, of receiving a plurality of the data frames flowing over the onboard network, obtaining, from each of the multiple data frames, a payload included in the data frame and configured of at least one field, and recording in a reception log stored in the storage unit as one record; and field extracting, of calculating, regarding each of a plurality of payload splitting pattern candidates indicating different regions within payloads of the plurality of data frames, one or more features relating to time-sequence change of values of the payload in the region, from the plurality of records, selecting, from the plurality of payload splitting pattern candidates, a payload splitting pattern indicating a region of a field within the payload, based on the features, and outputting field extracting results indicating the region indicated by the selected payload splitting pattern, and a category of the field based on the features.

The information processing method according to the present disclosure enables a safe onboard network system that detects attacks with good precision to be cost-efficiently provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of an operating mode that a mode storing unit according to the embodiment stores;

FIG. 6 is a diagram illustrating an example of a reception log that a reception log storing unit according to the embodiment stores;

FIG. 7 is a diagram illustrating an example of a normal model that a normal model storing unit according to the embodiment stores;

FIG. 9 is a block diagram illustrating the functional configuration of an ECU in the embodiment;

FIG. 10 is a diagram illustrating an example of part of a data frame that the ECU transmits;

FIG. 11 is a flowchart of processing by a payload splitting unit according to the embodiment;

FIG. 12 is a diagram illustrating an example used to describe extraction of features from splitting pattern candidates by the payload splitting unit according to the embodiment;

FIG. 13 is a flowchart of an example of constant-value field extracting processing according to the embodiment;

FIG. 14 is a diagram of an example of constant-value field extracting processing according to the embodiment;

FIG. 17 is a flowchart of an example of continuous-value field extracting processing according to the embodiment;

FIG. 18A is a diagram illustrating an example of calculating an average of variance in the amount of change of splitting pattern candidate values having a common bit length, in an example of continuous-value field extracting processing according to the embodiment;

FIG. 18B is a diagram illustrating an example of calculating outlier values of the aforementioned average and the average thereof, in splitting pattern candidate values having a common start bit position, in an example of continuous-value field extracting processing according to the embodiment;

FIG. 29 is a diagram illustrating a third operation example of the anomaly detection unit according to the embodiment.

DETAILED DESCRIPTION

Figure 1:
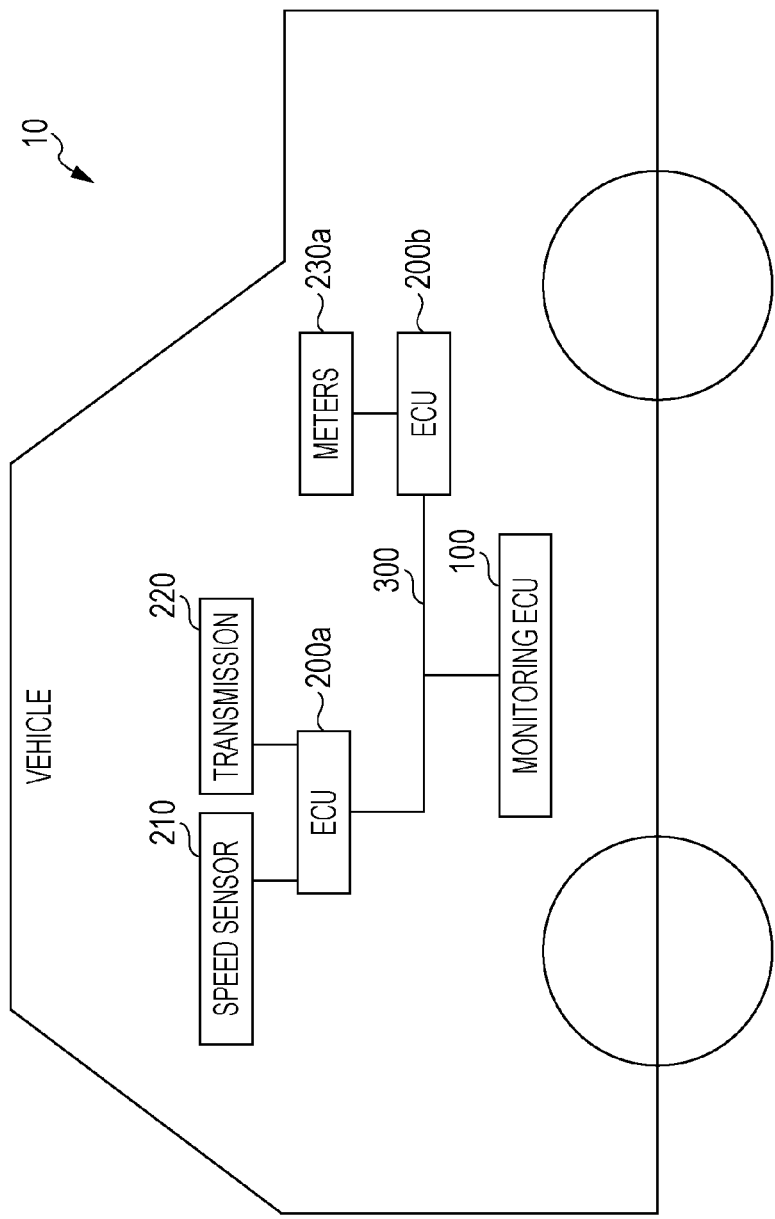
FIG. 1 is a block diagram illustrating the overall configuration of an onboard network system according to an embodiment.

The payload splitting precision in a technique such as in Markovitz et al. is low. The reason is that in the payload splitting method, splitting is performed by identifying the type and length of payloads using only a count of unique values observed in each of splitting candidates, calculated from collected frames.

The present disclosure provides an information processing method enabling highly precise anomaly detection to be realized in an onboard network system with good cost efficiency.

An information processing method according to an aspect of the present disclosure is an information processing method of processing data frames flowing over an onboard network including one or more electronic control units that is carried out by an information processing system having a storage unit. The information processing method includes: frame collecting, of receiving a plurality of the data frames flowing over the onboard network, obtaining, from each of the multiple data frames, a payload included in the data frame and configured of at least one field, and recording in a reception log stored in the storage unit as one record; and field extracting, of calculating, regarding each of a plurality of payload splitting pattern candidates indicating different regions within payloads of the plurality of data frames, one or more features relating to time-sequence change of values of the payload in the region, from the plurality of records, selecting, from the plurality of payload splitting pattern candidates, a payload splitting pattern indicating a region of a field within the payload, based on the features, and outputting field extracting results indicating the region indicated by the selected payload splitting pattern, and a category of the field based on the features.

Using this information processing system enables an anomaly detection system to be constructed that does not need individual design beforehand even in onboard network systems of different message specifications, thereby enabling protection of onboard networks with suppressed costs.

The reception log further may include information indicating an order in which the plurality of records have been received. The features include at least one of a first feature representing a count of patterns of the time-sequence change, a second feature representing an occurrence frequency of the time-sequence change, and a third feature representing statistical information relating to an amount of change of the time-sequence change.

Payloads can be split into fields with higher procession by individually using and combining these features. Accordingly, normal models with higher precision can be constructed, for example, and improved precision in anomaly detection of the onboard network can be expected.

In the field extracting, the information processing system may select a payload splitting pattern candidate indicating a region that exhibits time sequence changes one time or more regarding values of the payload, with each amount of change included in the time-sequence change having a predetermined magnitude or smaller, as the payload splitting pattern indicating a region of a field of a first category, based on the features.

Accordingly, fields of which values change according to a predetermined rule if normal, for example, can be identified and extracted. For example, this can be used for anomaly detection in the onboard network, by making fields identified in this way to be the object of monitoring since they readily become the target of attacks.

For example, the features may include the second feature and the third feature, and the information processing system may execute continuous value field extracting, of selecting, from the plurality of payload splitting pattern candidates, a payload splitting pattern indicating a region of a field of a continuous value category where the value of the payload indicates a physical quantity, based on the second feature and the third feature, thereby selecting the payload splitting pattern indicating the field of the first category. For example, in the field extracting, the information processing system may calculate, for each of the plurality of payload splitting pattern candidates, an outlier value score indicating a degree of outlying of the third feature out of the payload splitting pattern candidates indicating a region of the same data length, calculate an average value of the outlier value score of payload splitting pattern candidates, indicating a region of which a start bit is the same in the payload splitting pattern candidates, and select, out of the payload splitting pattern candidates indicating a region where the average value is a predetermined threshold value or above, a payload splitting pattern indicating a region of a field corresponding to the continuous value category, based on a magnitude relation of the second feature of the payload splitting pattern candidate included in the payload splitting pattern candidates.

Accordingly, a field indicating a physical quantity that a sensor measures and outputs, for example, can be identified. A field identified in this way can be used for anomaly detection in the onboard network, as an object of determining anomaly in values of that field or rate of change of values.

For example, in the field extracting, the information processing system may select, from the plurality of payload splitting pattern candidates, a payload splitting pattern that is a region that exhibits change each time in the value of the payload, and where the amount of change of each value of the payload is constant each time, as a payload splitting pattern indicating a region of a field of a counter category, based on the features, thereby selecting the payload splitting pattern indicating a field of the first category.

Accordingly, a field of which the value is incremented or decremented can be identified. A field identified in this way can be used for anomaly detection in the onboard network, as an object of determining anomaly, based on violation of rules regarding change in values of the field.

For example, in the field extracting, the information processing system may select a payload splitting pattern candidate that exhibits time-sequence change in the value of the payload one time or more, and that indicates a region where the value of the payload assumes a discrete value, as the payload splitting pattern indicating a region of a field of the second category, based on the features. The second category may be at least one of a checksum category to check consistency of the value of the payload within the field, and a status category where the value of the payload within the field indicates a predetermined state of a vehicle including the onboard network.

Accordingly, fields assuming a discrete value, such as a checksum or flag or the like, can be identified. A field identified in this way can be used for anomaly detection in the onboard network, as an object of determining anomaly, based on consistency of the value of this field with other fields, occurrence frequency of change, and so forth.

Also, in the field extracting, the information processing system may execute constant value field extracting, counter field extracting, the continuous value field extracting, and second category field extracting. In the constant value field extracting, a payload splitting pattern candidate where the first feature is 1 is selected from the plurality of payload splitting pattern candidates as a payload splitting pattern indicating a region of a field of the constant value category, the payload splitting pattern candidates out of the plurality of payload splitting pattern candidates of which at least part overlap this selected payload splitting pattern are excluded, and the remainder are taken as first payload splitting patterns. In the counter field extracting, a payload splitting pattern indicating a region of a field of the counter category is selected from the first payload splitting pattern candidates, the payload splitting pattern candidates out of the first payload splitting pattern candidates of which at least part overlap this selected payload splitting pattern are excluded, and the remainder are taken as second payload splitting pattern candidates. In the continuous value field extracting, a payload splitting pattern indicating a region of a field of the continuous value category is selected from the second payload splitting pattern candidates, using the second feature and the third feature, the payload splitting pattern candidates out of the second payload splitting pattern candidates of which at least part overlap this selected payload splitting pattern are excluded, and the remainder are taken as third payload splitting pattern candidates. In the second category field extracting, the third payload splitting pattern candidates are selected as the second category field.

Accordingly, the range of fields of each category can be efficiently identified from an unknown payload, and the fields can be extracted.

For example, the information processing method may further include a feature extracting executed by the information processing system, in which a normal model, indicating a normal range of change of values in a field indicated by the selected payload splitting pattern, is generated from the field extracting results and the reception log, based on statistical information relating to the amount of change in time-sequence change of values of this field, and the generated normal model is output.

Accordingly, references are obtained for anomaly determination of fields with various types of values, in addition to the range of fields of each category identified, thereby enabling anomaly detection of the onboard network to be carried out.

Each of the plurality of data frames may include a data type ID indicating the type of data frame, with the information processing system recording the payload and the data type ID to the reception log as one record in the frame collecting, and executing the field extracting on data frames having the data type ID in common.

Accordingly, a payload can be split into fields even in a case where multiple types of data frames coexist in data frames obtained from the bus.

It should be noted that these general or specific embodiments may be implemented as a system, a method, an integrated circuit, a computer program, or a computer-readable recording medium such as a CD-ROM, and may be realized by any combination of a system, method, integrated circuit, computer program, and recording medium.

The following is a description of an embodiment with reference to the drawings. Note that the embodiment described below is a general or specific example. Accordingly, values, shapes, materials, components, placements and connected states of components, steps, the order of steps, and so forth illustrated in the following embodiment, are only exemplary, and do not restrict the present disclosure. Components in the following embodiments which are not included in an independent Claim indicating a highest order concept are described as optionally included components.

First Embodiment

1. Configuration

The information processing system described as an embodiment receives data frames flowing over onboard network, splits the payloads of these data frames into fields, and constructs a behavior model relating to values included in normal data frames, for each of the fields obtained by splitting. This information processing system also monitors the onboard network based on this behavior model, and detects anomalous data frames. This information processing system will be described with reference to the drawings.

1.1 Overall Configuration of Onboard Network 10

FIG. 1 is a block diagram illustrating the overall configuration of the onboard network 10 according to the present embodiment. The onboard network 10 includes a monitoring ECU 100, ECUs 200, and a bus 300.

The monitoring ECU 100 is connected to the bus 300, monitors data frames flowing over the bus 300, and monitors whether unauthorized data frames including anomalies are flowing. The monitoring ECU 100 that has a microcontroller (omitted from illustration) including a communication circuit, processor, and memory is an example of the information processing system according to the present embodiment.

An ECU 200a is connected to a speed sensor 210 and a transmission 220, and an ECU 200b is connected to meters 230. The ECU 200a includes the speed of the vehicle obtained from the speed sensor 210 and the gearshift position of the transmission 220, in data frames which it periodically transmits to the bus 300. Upon receiving this data frame, the ECU 200b obtains the speed of the vehicle and the gearshift position of the transmission 220 notified from the ECU 200a, and displays on the meters 230.

The following is a brief description of the format of data transmitted in the CAN protocol, which is a communication standard used in the onboard network 10, to facilitate understanding of the present embodiment.

1.2 Data Frame Format

Figure 2:
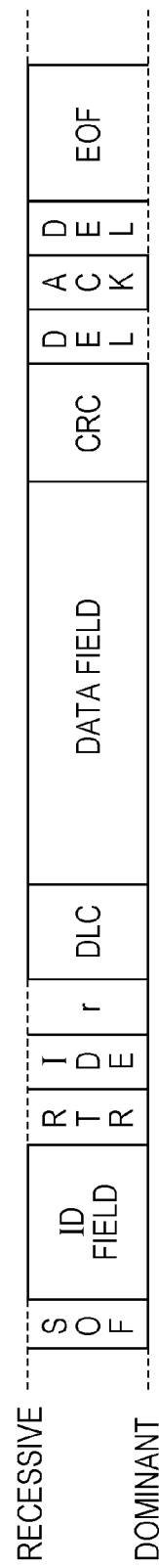
FIG. 2 is a diagram illustrating a data frame format in the CAN protocol.

FIG. 2 is a diagram illustrating a format of a data frame in the CAN protocol. The diagram illustrates a data frame according to a standard ID format stipulated in the CAN protocol here.

A data frame is configured including 12 parts of a Start Of Frame (hereinafter, SOF), ID field, Remote Transmission Request (hereinafter, RTR), Identifier Extension (hereinafter, IDE), reserved bit (hereinafter, r), Data Length Code (hereinafter, DLC), data field, Cyclic Redundancy Check (hereinafter, CRC) sequence, CRC delimiter, Acknowledgement (hereinafter, ACK) slot, ACK delimiter (DEL in FIG. 2)", and End Of Frame (hereinafter, EOF).

The SOF is made up of 1-bit dominant. The bus 300 is recessive when idle, and start of transmission of a frame is notified by a transmitting node changing the bus 300 from recessive to dominant.

The ID is a value 11 bits long, and indicates the type of data frame. The type of data frame here indicates, for example, the content of data or the transmitting node that is the transmission source of the data frame. The ID is also used for communication arbitration among data frames that have been transmitted at the same time by multiple nodes on the same network. Specifically, data frames with smaller ID values are given higher priority. The ID is an example of a data type ID in the present embodiment.

The RTR indicates that this is a data frame, and is 1-bit dominant. The IDE and "r" are each 1-bit dominant. The DLC is a value four bits long, and indicates the length of the subsequent data field.

The data field is the portion of data that is transmitted, a maximum of 64 bits long, and is equivalent to the payload of the data frame. The length can be adjusted in 8-bit increments. The specification relating to allocation of data being transmitted to this portion is dependent on the model and manufacturer.

The CRC sequence is 15 bits long, and indicates values calculated from transmitted values from the SOF, ID field, control field, and data field. The receiving node judges whether there is an anomaly or not by comparing the results calculated from the SOF, ID field, control field, and data field, with the CRC sequence value.

The CRC delimiter is 1-bit recessive, and is a sectioning symbol representing the end of the CRC sequence. The ACK slot is one bit long, and the transmitting node transmits recessive with this portion. If up to the CRC sequence has been received normally, the receiving node transmits dominant by this portion. Dominant has higher priority than recessive, as described above, so if dominant and recessive are transmitted at the same time in the CAN standard, so the bus 300 is in a dominant state during transmission of the ACK slot on the onboard network 10 where communication is being performed in a normal manner. The ACK delimiter is 1-bit recessive, and is a sectioning symbol representing the end of the ACK slot. The EOF is 7-bits recessive, and indicates the end of the data frame.

1.3 Error Frame Format

Figure 3:
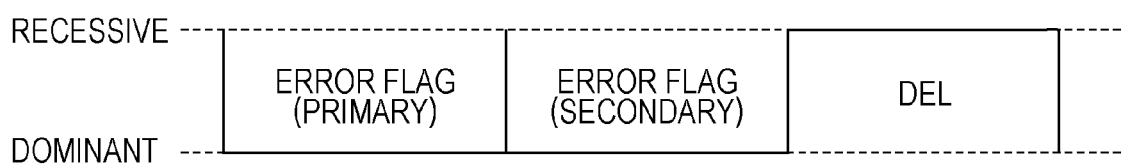
FIG. 3 is a diagram illustrating an error frame format in the CAN protocol.

FIG. 3 is a diagram illustrating the format of the error frame in the CAN protocol. An error frame is made up of the three parts of an error flag (primary), an error flag (secondary), and an error delimiter (DEL in the FIG. 3).

The error flag (primary) is used to notify occurrence of an error to other nodes. This is six consecutive bits dominant, which violates the bit stuffing rule in the CAN protocol where, after five bits consecutive for the same value, one bit of a different value must be transmitted next. Occurrence of this bit stuffing rule violation cases other nodes to transmit error flags (secondary).

The error flag (secondary) is 6-bit length dominant, transmitted to notify occurrence of an error to the other nodes. All nodes that have received the error flag (primary) transmit this. The error delimiter is 8-bit recessive, and indicates the end of the error frame.

1.4 Configuration Diagram of Monitoring ECU 100

Figure 4:
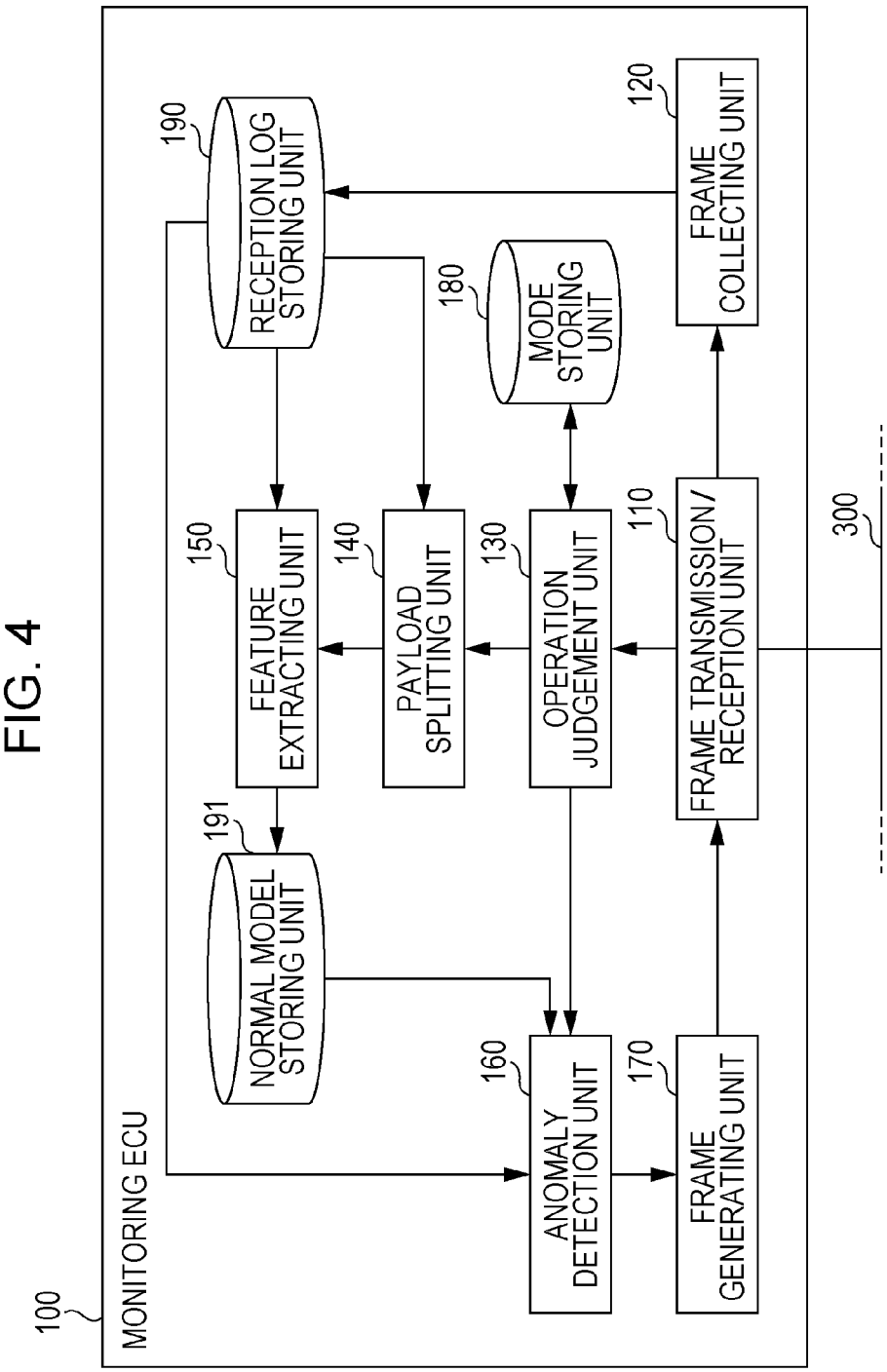
FIG. 4 is a block diagram illustrating the function configuration of a monitoring ECU according to the embodiment.

FIG. 4 is a block diagram illustrating the functional configuration of the monitoring ECU 100. The monitoring ECU 100 includes a frame transmission/reception unit 110, a frame collecting unit 120, an operation judgement unit 130, a payload splitting unit 140, a feature extracting unit 150, an anomaly detection unit 160, a frame generating unit 170, a mode storing unit 180, a reception log storing unit 190, and a normal model storing unit 191.

The frame transmission/reception unit 110 transmits and receives data frames conforming to the CAN protocol to and from the bus 300. That is to say, the frame transmission/reception unit 110 receives data frames from the bus 300 one bit at a time. Upon completing reception of the data frame without error, the ID, DLC, and data field contained in the data frame is transferred to the frame collecting unit 120 and operation judgement unit 130. In a case of judging that a received data frame does not conform to the CAN protocol, the frame transmission/reception unit 110 transmits an error frame. In a case of having received an error frame from another node, i.e., in a case of judging that a received frame is an error frame from a value thereof, the data frame being received is discarded. In a case of having received a transmission request for a data frame from the frame generating unit 170, the frame transmission/reception unit 110 transmits a data frame to the bus 300 one bit at a time.

The frame collecting unit 120 receives the aforementioned part of the data frame from the frame transmission/reception unit 110, and records the time at which this data frame was received (hereinafter referred to as reception time), and the ID and data field contained in the data frame, in a reception log stored in the reception log storing unit 190 as one record. The reception time is recorded by referencing a timer that measure the amount of running time that has elapsed from the monitoring ECU 100 having been started up, for example. This sort of timer is included in the microcontroller that the monitoring ECU 100 has, for example.

At the time of receiving a data frame, the operation judgement unit 130 references a value indicating the operating mode, stored in the mode storing unit 180, and decides the sequential operations of the monitoring ECU 100, in accordance with this operating mode. The monitoring ECU 100 has two operating modes, a collection mode and a monitoring mode. In a case where the collection mode is decided as the operating mode, the operation judgement unit 130 checks whether the monitoring ECU 100 has been operating for one hour or more total. In a case where the monitoring ECU 100 has not been operating for one hour or more, no operations are performed in particular. In a case where the monitoring ECU 100 has been operating for one hour or more, the operation judgement unit 130 makes a predetermined operation request to the payload splitting unit 140, and thereafter switches the operating mode to the monitoring mode. In a case where the operating mode is the monitoring mode, an anomaly detection request is made to the anomaly detection unit 160.

The payload splitting unit 140 references the reception log stored in the reception log storing unit 190, splits the payload i.e., data field, of records having a common ID, and extracts a field that is a bit string having a particular meaning (hereinafter referred to as field). A field included in a data field is categorized into one of the categories of constant value, counter, continuous value, checksum, and status, in accordance with the information indicated therein. For example, a region or the like occupied by a value indicating the speed of the automobile that has been measured by the speed sensor 210 corresponds to one field, and this field is classified as a continuous value. Details of the splitting method will be described in the later-described sections 1.11 through 1.16. The payload splitting unit 140 also notifies the feature extracting unit 150 of information relating to fields obtained by splitting payloads of recordings including a common ID. Examples of this information include field category, field region, and field value.

The feature extracting unit 150 generates a normal model from the information notified from the payload splitting unit 140 relating to fields obtained by splitting payloads, and reception log, and stores this in the normal model storing unit 191. This sort of normal model is generated for each data frame ID, and includes average and variance in reception intervals that is information relating to reception intervals of data frames, field region that is information relating to data fields, category, and behavior information.

Of the information relating to data fields, the behavior information is generated for each field, from payload values included in the reception log stored in the reception log storing unit 190. The information included in the behavior information differs depending on the category of the field. For example, behavior information of a field belonging to the constant value category includes a value of observed constant values in the reception log. This value is used as a whitelist value in the monitoring mode. There is no behavior information regarding fields belonging to the counter category. The behavior information for the continuous value category includes the average and variance regarding difference in values, i.e., the amount of change, in this field among consecutive data frames observed in the reception log. The behavior information of a field belonging to the status category includes the rate of occurrence of change in value in the field from the data frame immediately prior in time-sequence, as to the total number of data frames of a certain ID, i.e., the occurrence frequency of change. Note that the status is some sort of state of the vehicle, and for example indicates whether a particular device such as headlights or the like are on or off, the gearshift position, the driving mode, or the like.

The anomaly detection unit 160 performs processing for detecting reception of an unauthorized data frame in a case of having received an anomaly detection request from the operation judgement unit 130 (hereinafter referred to as anomaly detection processing). More specifically, the anomaly detection unit 160 references the reception log stored in the reception log storing unit 190, and determines whether or not there is reception of an unauthorized data frame using the normal model stored in the normal model storing unit 191 and the reception log.

For example, with regard to a field belonging to the constant value category in a normal model of a data frame of a certain ID, the anomaly detection unit 160 compares the value of the region of this field within the data field of records in the reception log including this ID, with the value indicated in the behavior information of this field in the normal model. In a case where these values differ, the anomaly detection unit 160 determines that an unauthorized data frame has been received.

Also, with regard to a field belonging to the counter category in a normal model of a data frame of a certain ID, the anomaly detection unit 160 determines whether or not the value of the region of this field within the data field of records in the reception log including this ID is being correctly incremented in time order. In a case where it is not being correctly incremented, the anomaly detection unit 160 determines that an unauthorized data frame has been received.

Also, with regard to a field belonging to the continuous value category in a normal model of a data frame of a certain ID, the anomaly detection unit 160 determines whether or not the amount of change from the value in a region of this field within the data field in an immediately-prior record including this ID in the reception log, is an outlier value as to the average of amount of change included in the behavior information for this field in the normal model. If an outlier value, the anomaly detection unit 160 determines that an unauthorized data frame has been received. Note that determination of whether or not an outlier value is performed using variance in the amount of change indicated in the behavior information of the normal model, regarding to whether or not within a range of $\pm 3 \times (\sqrt{\text{variance}})$ of the average value of change of amount of values in this field, for example.

Also, with regard to a field belonging to the status category in a normal model of a data frame of a certain ID, the anomaly detection unit 160 compares the frequency of occurrence of change in the value of the field when viewing the value of the region of this field within the data field of records in the reception log including this ID over a predetermined amount of time, such as one second or the like, with the frequency of occurrence indicated in the behavior information in the normal model. In a case where the difference in these frequencies of occurrence is greater than a predetermined threshold value, the anomaly detection unit 160 determines that an unauthorized data frame has been received.

Upon detecting that a data frame including an anomaly has been detected by such determination, the anomaly detection unit 160 requests the frame generating unit 170 to generate a data frame for notification that an unauthorized data frame is being received, for example.

Upon being requested by the anomaly detection unit 160 to generate the aforementioned data frame, the frame generating unit 170 generates the data frame for notification that an unauthorized data frame is being received, and notifies the frame transmission/reception unit 110.

The mode storing unit 180 stores a value indicating the current operating mode of the monitoring ECU 100. The operating mode is the collection mode or monitoring mode, as described above. FIG. 5 illustrates an example of the operating mode that the mode storing unit 180 stores. The monitoring mode will be described in the later-described section 1.6.

The reception log storing unit 190 stores information of the data frame notified from the frame collecting unit 120 (reception time, ID, DLC, and data field). FIG. 6 illustrates an example of a reception log stored in the reception log storing unit 190. The reception log will be described in the later-described section 1.7.

The normal model storing unit 191 stores a normal model that the feature extracting unit 150 has extracted. FIG. 7 illustrates an example of a normal model that the normal model storing unit 191 stores. The normal model will be described later in section 1.8.

These functional components are realized at the microprocessor that the monitoring ECU 100 has, by the processor processing data frames received via a communication circuit by executing a program stored in memory, and saving data generated partway through or at the end of processing in memory as necessary.

1.5 Operations of Monitoring ECU 100

Figure 8:
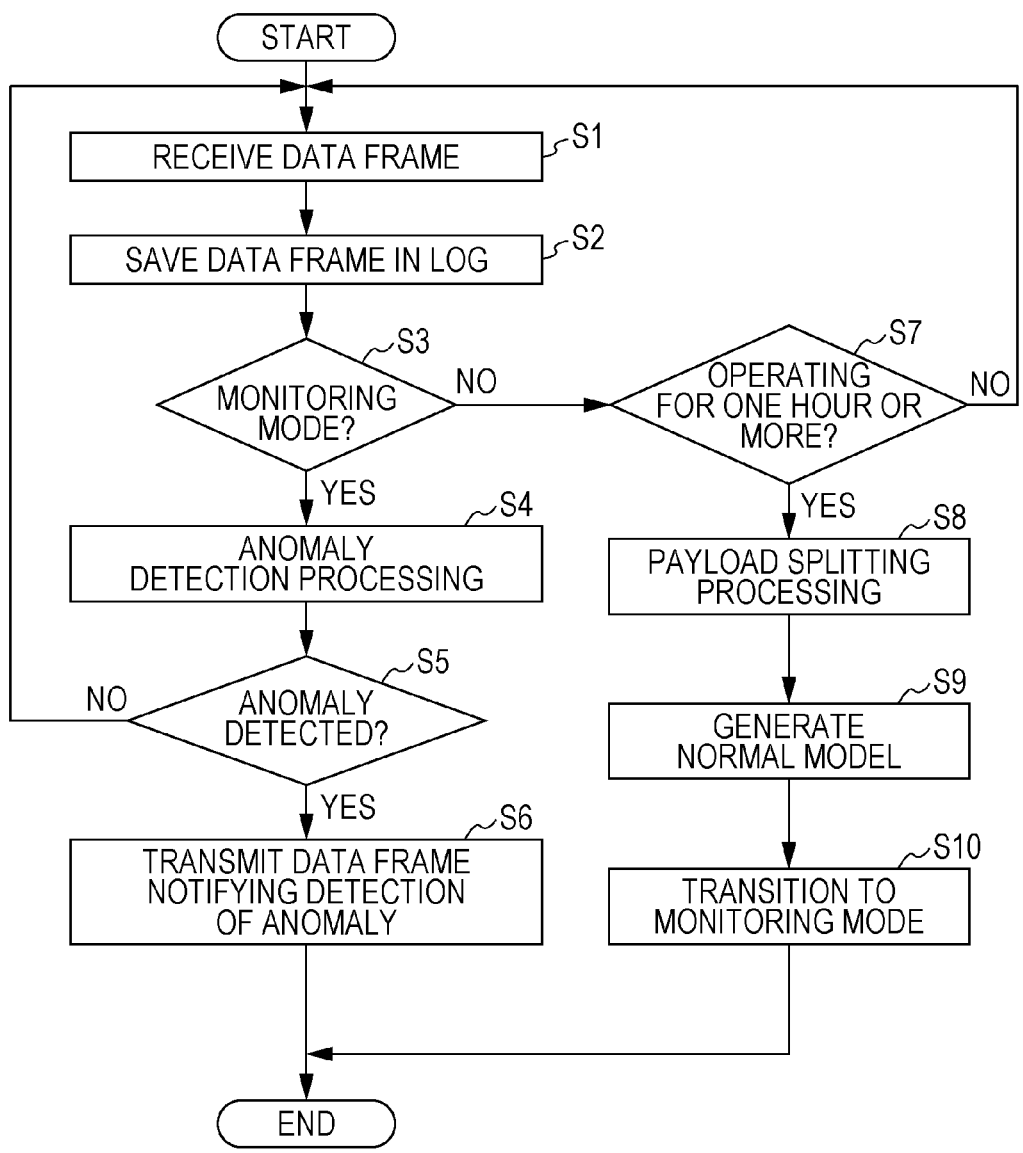
FIG. 8 is a flowchart of operations of the monitoring ECU according to the embodiment.

A series of processes in operations of the monitoring ECU 100 configured as described above will be described with reference to the flowchart illustrated in FIG. 8.

Step S1: The frame transmission/reception unit 110 of the monitoring ECU 100 receives a data frame flowing over the bus 300 of the onboard network.

Step S2: The frame collecting unit 120 of the monitoring ECU 100 records a record including the reception time, ID, and data field of the data frame received in step S1, in a reception log stored in the reception log storing unit 190.

Step S3: The operation judgement unit 130 of the monitoring ECU 100 references the mode storing unit 180 and confirms the current operating mode of the monitoring ECU 100. In a case where the current operating mode is the monitoring mode (case of YES), the operation judgement unit 130 advances to step S4. Otherwise, i.e., in a case where the current operating mode is the collection mode (case of NO), the operation judgement unit 130 advances to step S7.

Step S4: The operation judgement unit 130 of the monitoring ECU 100 makes an anomaly detection processing request to the anomaly detection unit 160, and the anomaly detection unit 160 performs anomaly detection processing such as described above.

Step S5: In a case where an anomaly has been detected as the result of the anomaly detection processing (case of YES), the anomaly detection unit 160 of the monitoring ECU 100 advances to step S6. Otherwise (case of NO), the monitoring ECU 100 returns to step S1.

Step S6: The anomaly detection unit 160 of the monitoring ECU 100 transmits a data frame generation request, to notify the other nodes that an anomaly has been detected, to the frame generating unit 170. The frame generating unit 170 generates the data frame notifying of reception of an unauthorized data frame, transmits this data frame to the bus 300 via the frame transmission/reception unit 110, and ends.

Step S7: The operation judgement unit 130 of the monitoring ECU 100 determines whether the monitoring ECU 100 has been operating for one hour or longer. In a case where the monitoring ECU 100 has been operating for one hour or more (case of YES), the flow advances to step S8. Otherwise (case of NO), the monitoring ECU 100 returns to step S1.

Step S8: The operation judgement unit 130 of the monitoring ECU 100 makes a payload splitting processing request to the payload splitting unit 140. The payload splitting unit 140 performs splits the data field that is the payload of the data frame and performs field extracting processing.

Step S9: The feature extracting unit 150 of the monitoring ECU 100 generates a normal model using the results of the field extracting processing by the payload splitting unit 140, and stores the normal model in the normal model storing unit 191.

Step S10: The operation judgement unit 130 of the monitoring ECU 100 rewrites the value of the operating mode stored in the mode storing unit 180, and switches the operating mode of the monitoring ECU 100 from the collection mode to the monitoring mode.

Of the above steps, step S1 and step S2 are an example of frame collection in the present embodiment, and step S8 is an example of field extracting in the present embodiment. The flowchart shows the operation of the monitoring ECU 100 ending after the procedure of step S6 or step S10, but actually the operations may return to step S1 and be continued repetitively.

1.6 Data Configuration of Operating Mode

An example of the operating mode that the mode storing unit 180 stores will be illustrated with reference to FIG. 5. This example indicates that the current operating mode of the monitoring ECU 100 is the collection mode. In the collection mode, data fields of data frames and the like that the monitoring ECU 100 receives are stored in the reception log storing unit 190 by the frame collecting unit 120.

1.7 Data Configuration of Reception Log

FIG. 6 illustrates an example of a reception log that the reception log storing unit 190 stores. This reception log is in a state after having received multiple data frames of which the ID is 0×100. Each row in the data rows is one record, and are in order of time from top to bottom.

The length of the data field is five bits in this example, the reception time of the data frame received the earliest in the reception log is 51 ms, and the value of the data field is 0×00 0×00 0×00 0×10 0×10. The reception time of the data frame received the latest in the reception log is 500450 ms, and the value of the data field is 0×26 0×15 0×4B 0×30 0×B6.

1.8 Data Configuration of Normal Model

FIG. 7 illustrates an example of a normal model that the normal model storing unit 191 stores. The normal model illustrated in this example is a normal model regarding data frames of ID 0×100. This normal model includes, as information relating to reception intervals of data frames of ID 0×100, 50 ms which is the average of reception intervals, and 3 ms which is the variance of reception intervals. Also included as information relating to data fields is the start bit position, bit length, category, and behavior information, of each of the seven fields obtained by splitting the data field. More specifically, a field from the highest order first bit to eight bit in the data field is a field indicating a counter. A field that is two bits long from the highest order ninth bit in the data field indicates a constant value, and the value thereof is 0. A field that is 14 bits long from the highest order 11th bit in the data field indicates a continuous value, the average of the change amount in change occurring in field values is 10, and variance is 100. A field that is one bit long from the highest order 25th bit in the data field indicates a constant value, and the value thereof is 0. A field that is three bits long from the highest order 26th bit in the data field indicates status of the vehicle, and the frequency of change occurring in this value is 0.0001. A field that is eight bits long from the highest order 33rd bit in the data field is a checksum.

1.9 Configuration of Other ECUs

FIG. 9 is a block diagram illustrating the functional configuration of the ECU 200a or ECU 200b, which are examples of nodes connected to the onboard network. The ECU 200a includes a frame transmission/reception unit 201, a frame processing unit 202, an external device input/output unit 203, and a frame generating unit 204. These functional components are realized by a communication circuit, a processor or digital circuits that execute a control program stored in memory, or the like, in the ECU 200a.

The frame transmission/reception unit 201 transmits and receives data frames conforming to the CAN protocol to and from the bus 300. That is to say, the frame transmission/reception unit 201 receives data frames from the bus 300 one bit at a time. Upon completing reception of the data frame without error, the ID, DLC, and data field contained in the data frame is transferred to the frame processing unit 202. In a case of judging that a received data frame does not conform to the CAN protocol, the frame transmission/reception unit 201 transmits an error frame. In a case of having received an error frame from another node, the frame transmission/reception unit 201 discards the data frame being received. Processing conforming to the CAN protocol, such as communication arbitration, is also executed at the frame transmission/reception unit 201.

The frame processing unit 202 interprets the contents of received data frames. For example, the ECU 200b information of obtains the speed measured by the speed sensor 210 and the gearshift position of the transmission 220, included in the data field of a data frame transmitted from the ECU 200a, and notifies the external device input/output unit 203 of control information to display this information on the meters 230. At this time, the frame processing unit 202 confirms whether or not the counter and checksum included in the data field satisfy predetermined conditions. More specifically, confirmation is made regarding whether the counter is a larger value than the value of a counter included in a data frame of the same ID that has already been received.

As for the checksum, for example, the data field is split into single bytes except for the checksum field, and confirmation is made regarding whether the lower one byte of the sum of adding all the values is the value of the checksum. In a case where the counter and checksum satisfy these conditions, information based on the received data frame is displayed on the meters 230.

The external device input/output unit 203 performs communication with external devices connected to the ECU 200a or ECU 200b. In the case of the ECU 200a for example, the external device input/output unit 203 is connected to the speed sensor 210 and the transmission 220, receives notification of information regarding the current speed of the vehicle and the gearshift position of the transmission 220, and notifies the frame generating unit 204 of this information. In the case of the ECU 200b, the external device input/output unit 203 is connected to the meters 230, and transmits signals to the meters 230 to display information of the current speed of the vehicle and the gearshift position of the transmission 220, so as to notify the driver of this information.

The frame generating unit 204 generates data frames to be transmitted to the bus 300. In the ECU 200a for example, data frames including the speed of the vehicle obtained from the speed sensor 210 and the gearshift position obtained from the transmission 220, which have been notified from the external device input/output unit 203, are generated at a predetermined cycle, such as 20 ms intervals of example, and transmitted to the frame transmission/reception unit 201. The counter and checksum are also included in this data frame. The counter is incremented with each transmission, and the checksum is calculated so as to satisfy the above-described expression. Note that he interval of transmitting data frames may be an interval other than 50 ms. FIG. 10 illustrates an example of part of a data frame that the ECU 200a transmits to the bus 300. The monitoring ECU 100 and ECU 200b receive this data frame from the bus 300. In this way, a data frame is configured from at least one field, which is a bit stream having a particular meaning. However, this data field is only data of five bits in length to the monitoring ECU 100 operating in collection mode, since an appropriate method for splitting the data field or the contents of the data field in the received data frame is unknown.

1.10 Configuration of Data Frames Transmitted by ECUs

The configuration of data frames that each of the ECUs connected to the onboard network will be described by way of example. FIG. 10 is a diagram illustrating an example of a data frame that the ECU 200a transmits. Note however, that FIG. 10 only illustrates an excerpt of the portion necessary for description of the present embodiment.

The ECU 200a transmits a data frame that has an ID of 0×100 and a DLC of 5. The region of the first one byte of the data field is a counter field, and the value thereof is 0×26. The value of the counter field is incremented with each transmission. A region where the second byte and third byte of the data field are linked is a field indicating the speed measured by the speed sensor 210. In this example, the speed is represented in increments of 0.01 km/h, and the value of 0×154B indicates that the measured value of speed is 54.51 km/h.

The region of the higher order four bits of the fourth byte is a field indicating the gearshift position of the transmission 220, where 0 represents neutral, 1 parking, 2 reverse, and 3 drive. This value is 3 in the example in FIG. 10, so the gearshift position is drive. The region of the lower order four bytes of the fourth byte are a constant value field, and is solid 0s.

The fifth byte is a checksum field. The value that is placed in this field is the value of the lowest order byte of a sum obtained by dividing the portions of the data field other than the checksum field into single byte regions, and adding the values of the regions. Obtaining the sum of values of such regions in the example in FIG. 10 gives 0×26+0×15+0×4B+ 0×30=0×B6. Accordingly, the correct value to be placed in the checksum field is 0×B6.

Note that as described above, the regions occupied by the fields and the types of information, i.e., field categories, that fields indicate in a data field such as described above, are dependent on specifications that individual automakers decide on, and also may differ depending on the model or year, as described earlier.

In the monitoring ECU 100, the payload splitting unit 140 divides a data field of which the regions of fields and categories are unknown, by splitting using features relating to change in values within the data field, and extracting fields. Next, the processing of dividing the data field by the payload splitting unit 140 and extracting fields will be described by way of example.

1.11 Processing by Payload Splitting Unit 140

A series of steps of the payload splitting unit 140 performing the processing of splitting a data field and extracting fields will be described with reference to the flowchart illustrated in FIG. 11. The payload splitting unit 140 performs these operations in step S8 in the flowchart in FIG. 8. The payload splitting unit 140 executes the field extracting processing according to these operations, from a state where the monitoring ECU 100 has already received multiple data frames, and records including multiple types of IDs are recorded in the reception log.

Step S11: Upon receiving a payload splitting processing request from the operation judgement unit 130 made in step S8, the payload splitting unit 140 references the reception log storing unit 190, and extracts records from the reception log for each ID.

Step S12: In a case where field extraction has been completed for all IDs included in the reception log (case of NO), the payload splitting unit 140 ends operations, and notifies the feature extracting unit 150 of the results of field extraction. In a case where there is an ID regarding which field extraction has not been executed yet (case of YES), selects one of the records of the ID regarding which field extraction has not been executed yet. That is to say, the payload splitting unit 140 splits the data fields of data frames having in common an ID regarding which field extraction has not been executed yet, and extracts fields.

Step S13: The payload splitting unit 140 calculates features for each splitting pattern candidate of a data field. A splitting pattern candidate is a pattern of a region obtained by splitting a data field into bit increments, and is expressed by a combination (Index, Length) of the start bit position (hereinafter also referred to as Index) of the region, and the data length (hereinafter also referred to as Length) expressed in increments of bits, for example. For example, with regard to a data field that is 64 bits long, the Index and Length may each assume a value of 1 to 64, but Index+Length−1 (final bit position of the region) does not exceed 64. Accordingly, an Index of value 1 has 64 patterns for Length, which are 1 through 64, an Index of value 2 has 63 patterns, which are 1 through 63, an Index of value 3 has 62 patterns for Length, which are 1 through 62, and an Index of value 64 has only one pattern for Length. That is to say, in the case of a 64-bit long data field, the number of splitting pattern candidates is $$\Sigma x (X=1 \text{ to } 64)=65 \times 64 \div 2 = 2080$$

patterns. These splitting pattern candidates are an example of payload splitting pattern candidates according to the present embodiment.

FIG. 12 is a diagram illustrating an example for describing extracting features from splitting pattern candidates. In FIG. 12, values of five-byte long data fields, included in 256 records that have a certain ID in common and that have been extracted from the reception log, are arrayed from the top in order of reception.

In the present embodiment, the features relate to change in values of data fields that are in a range of the splitting pattern candidates, and there are three types. Each of the features will be described in further detail by the example of splitting pattern candidate (13, 8). This splitting pattern candidate (13, 8) is indicated by a dotted line frame in FIG. 12.

The first feature is the number of patterns of the values in the data field in the region that the splitting pattern candidates indicate. This feature can be obtained by counting the number of types of values in a data field indicated by a splitting pattern candidate, or by counting the number of values in a data field in the region from which duplicates have been excluded. This feature will be referred to hereinafter as a first feature.

The second feature is the occurrence frequency of change in value from the immediately-prior frame in time-sequence. This feature can be obtained by dividing the number of times that a value in a data field within a region indicated by a splitting pattern candidate has changed, by the number of records that include in common an ID extracted from the reception log minus one. The number of times that the value in a data field has changed can be obtained by obtaining the differences within this region of the records arrayed in time-sequence, and counting the number of which the difference is not 0. For example, in a case where there are 256 records as illustrated in FIG. 12, and the number of times that there has been change from a data frame received immediately before in the region (13, 8) is 51 times, this feature for this region (13, 8) is 51/(256−1)=0.2. This feature will be referred to hereinafter as a second feature.

The third feature is variance in the amount of change occurring from the immediately-prior frame in time-sequence. This feature can be calculated by the amount of change obtained from difference, as described above. This feature will be referred to hereinafter as a third feature.

Step S14: The payload splitting unit 140 selects, from the splitting pattern candidates, those of which the features extracted in step S13 satisfy predetermined conditions, as splitting patterns indicating the region of a field belonging to the constant value category. This selection will be described by way of example in the later-described section 1.12.

Since no one bit can be included in two fields, the payload splitting unit 140 excludes splitting pattern candidates, of which at least one part overlaps the region selected in step S14, from being the object of conditions determination in subsequent steps. The remaining splitting pattern candidate will be referred to hereinafter as first payload splitting pattern candidates.

Step S15: The payload splitting unit 140 selects, from the first payload Splitting pattern candidates, those of which the features extracted in step S13 satisfy the predetermined conditions, as splitting pattern candidates indicating the region of a field belonging to the counter category. This selection will be described by way of example in the later-described section 1.13.

The payload splitting unit 140 further excludes splitting pattern candidates of which at least partly overlap the region selected in step S15, from being the object of conditions determination in subsequent steps. The remaining splitting pattern candidates will be referred to hereinafter as second payload splitting pattern candidates.

Step S16: The payload splitting unit 140 selects out of the second payload splitting pattern candidates, those of which the features extracted in step S13 satisfy predetermined conditions, as splitting patterns indicating a field region belonging to the continuous value category. This selection will be described by way of example in the later-described section 1.14.

The payload splitting unit 140 further excludes splitting pattern candidates of which at least partly overlap the region selected in step S16, from being the object of conditions determination in subsequent steps. The remaining splitting pattern candidates will be referred to hereinafter as third payload splitting pattern candidates.

Step S17: The payload splitting unit 140 selects out of the third payload splitting pattern candidates, those of which the features extracted in step S13 satisfy predetermined conditions, as splitting patterns indicating a field region belonging to the checksum category. This selection will be described by way of example in the later-described section 1.15.

Step S18: The payload splitting unit 140 selects the splitting pattern candidates that still remain as splitting patterns indicating a field region belonging to the status category. This selection will be described by way of example in the later-described section 1.16.

Extracting of fields from the data field of data frames having one type of ID is completed in step S18, and the flow returns to step S12. If there are unprocessed data frames of another ID, these become the object of the payload splitting unit 140 executing steps S13 and thereafter.

1.12 Constant Value Field

FIG. 13 is a flowchart of an example of extracting processing of the constant value field in step S14 by the payload splitting unit 140. FIG. 14 is a diagram illustrating an example for describing this processing. An assumption may be made that table data such as that illustrated in FIG. 14 is stored in the memory of the monitoring ECU 100 as the result of the processing in step S13.

Step S141: First, the payload splitting unit 140 extracts, from the splitting pattern candidates regarding which the above-described three types of features have been calculated, splitting pattern candidate that satisfy a condition that the first feature is 1. That is to say, splitting pattern candidates, of which the value of the data field indicates a range common to all records extracted from the reception log, are extracted.

In the table exemplified in FIG. 14, each row represents the start bit position (Index) of a region that a 5-byte data field splitting pattern candidate indicates, and each column indicates the bit length (Length) of that region. The cells contain the features calculated in step S13, in the order of the first feature, second feature, and third feature, which is to say in the order of number of patterns of values, occurrence frequency of change, and variance in the amount of change. Cells indicating combinations between start bit position and bit length that do not occur within the data field are crossed out. Listing of values of features, or whether there is a combination or not, has been omitted in some of the cells, and replaced with " . . . ". The splitting pattern candidates extracted in step S141 in the case of this example are the splitting pattern candidates indicating regions (29, 1), (29, 2), (29, 3), (29, 4), (30, 1), (30, 2), (30, 3), (31, 1), (31, 2), and (32, 1).

Step S142: The payload splitting unit 140 further narrows down the extracted splitting pattern candidates in light of predetermined conditions. Specifically, in a case where an entire region indicated by one splitting pattern candidate included in the extracted splitting pattern candidates is included in a region indicated by another splitting pattern candidate, this one splitting pattern candidate is excluded. Thus, splitting pattern candidates indicating only part of the constant value region made up of continuous bits are excluded.

Step S143: The payload splitting unit 140 selects the remaining splitting pattern candidates as splitting patterns indicating a region of a field belonging to the constant value category. In the above-described example, the splitting pattern candidate indicating region (29, 4) remains as the result of having executed step S142, so this splitting pattern candidate is selected as the region of a field belonging to the constant value category.

Step S144: The payload splitting unit 140 deletes other splitting pattern candidates that overlap the splitting pattern candidate selected in step S143. That is to say, other splitting pattern candidates including bits included in the selected splitting pattern candidate are deleted.

In this example where the splitting pattern candidate indicating region (29, 4) has been selected in step S143, splitting pattern candidates including any one of the bits from the 29th bit through the 32nd bit in a 5-byte long data field are deleted in step S144. More specifically, both splitting pattern candidates where the start bit position is 1 and the bit length is 29 through 40, and splitting pattern candidates where the start bit position is 2 and the bit length is 28 through 39, are deleted. Further, splitting patterns where the start bit position is 29 through 32 are all deleted. The remaining splitting pattern candidates are the above-described first payload splitting pattern candidates.

Step S145: The payload splitting unit 140 outputs the results of having selected splitting patterns indicating the region of the constant value field. In this example, the payload splitting unit 140 writes to the memory of the monitoring ECU 100 that the field where the start bit position is 29 and the bit length is 4 is a field belonging to the constant value category, or the like, and ends step S14.

1.13 Counter Field

Figure 15:
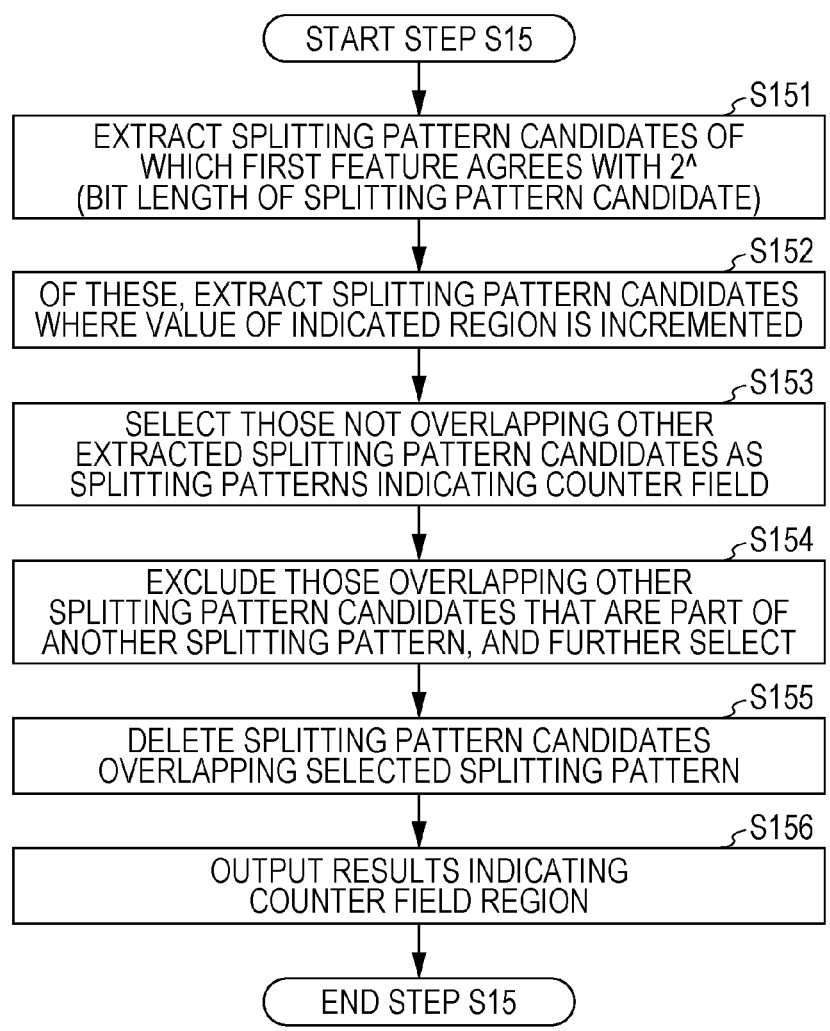
FIG. 15 is a flowchart of an example of counter field extracting processing according to the embodiment.

FIG. 15 is a flowchart of an example of extracting processing of the counter field in step S15 by the payload splitting unit 140.

Step S151: First, the payload splitting unit 140 extracts, from the above-described first payload splitting pattern candidates, splitting pattern candidates of which the first feature matches 2^(bit length of splitting pattern) or the number of records extracted from the reception log in step S11. That is to say, out of the records extracted in step S11, those where all values that can be expressed by the bit length of the splitting pattern candidates, or those where the values of all records are different, are extracted.

Step S152: The payload splitting unit 140 references the reception log storing unit 190, and extracts all values of regions indicated by the extracted splitting pattern candidate. Then, out of the splitting pattern candidates extracted in step S151, splitting pattern candidates where the value of the extracted field is incremented in the order of reception, or splitting pattern candidates of a region where the value returns to zero when overflowing, i.e., all digits of a region are 1 in binary expression and then all digits are 0 in the next record, are extracted.

Step S153: The payload splitting unit 140 selects, out of the splitting patterns extracted in step S152, those that do not overlap other candidates for splitting patterns, as splitting patterns indicating a region of a field belonging to the counter category.

Step S154: The payload splitting unit 140 excludes, out of the splitting patterns extracted in step S152 that overlap other splitting pattern candidates, those that are part of another splitting pattern candidate, and further selects these as splitting patterns indicating a region of a field belonging to the counter category. This is a step performed to find the longest bit string of which the value is incremented, as a single counter field.

Step S155: The payload splitting unit 140 deletes other splitting pattern candidates that overlap the splitting pattern candidates selected in steps S153 and S154, i.e., that include bits included in the selected splitting pattern candidates. Step S155 is a step similar to step S144, so detailed description will be omitted. The splitting pattern candidates remaining after step S155 are the above-described second payload splitting pattern candidates.

Step S156: The payload splitting unit 140 outputs the results of having selected the splitting pattern indicating the region of the counter field, and ends step S15.

Note that as a modification of the counter field extracting method, incrementing may be one each, or may be two each. Increase may be made by any sort of value, as long as being constantly increased. Further, a decremented counter may be extracted. In the same way, decrementing may be decreasing by one each, or may be decreasing by two each, or by any sort of value, as long as being constantly decreased.

Also in step S151, splitting pattern candidates may be extracted that indicate splitting patterns where values change in all records, or splitting pattern candidate may be extracted based on the second feature, i.e., splitting pattern candidates where the second feature is 1.

1.14 Continuous Value Field

Figure 16:
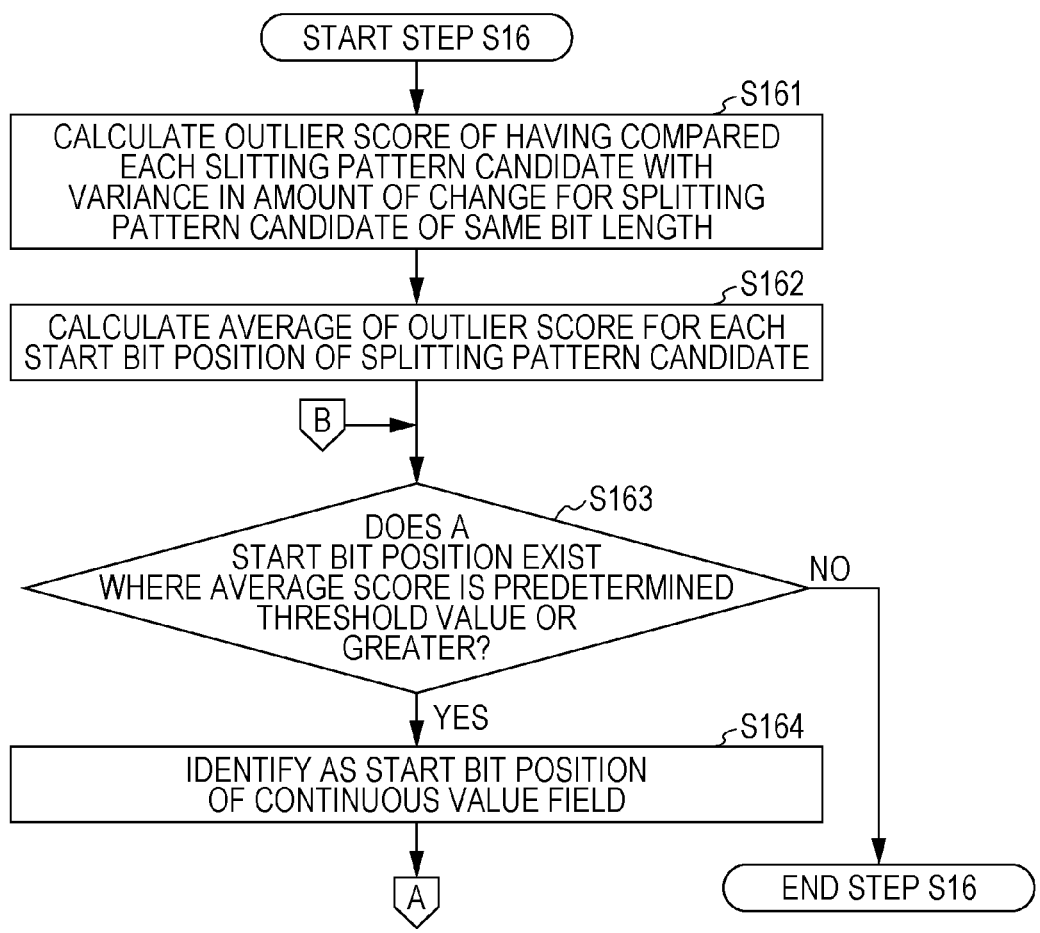
FIG. 16 is a flowchart of an example of continuous-value field extracting processing according to the embodiment.

FIGS. 16 and 17 are flowcharts of an example of continuous-value field extracting processing by the payload splitting unit 140 in step S16. FIGS. 18A and 18B are diagrams illustrating an example for describing this processing.

Now, the second payload splitting pattern candidates, i.e., the splitting pattern candidate remaining at the point of starting the continuous-value field extracting processing, belong to one category of continuous value, checksum, and status. It is thought that of these types of fields, the variance in the amount of change (third feature) is smaller for a continuous value field as compared to splitting pattern candidates of the same bit length that belong to the other categories. The reason will be described below.

Values that the checksum or flag can assume are discrete, with higher-order bits in the field changing independently from lower-order bits, so there tends to be irregularity in the amount of change of values. Accordingly, the variance in the amount of change of the values in the field is great. In the other hand, change in values is consecutive for a continuous value, with changes in a lower-order bit in the field carrying over and being manifested as change in a higher-order bit, is the amount of change of value stays within a certain range. Accordingly, variance in the amount of change of values within the field is small.

Also, in a case where a higher-order portion in a region that one splitting pattern candidate indicates is a continuous value and a lower-order portion is other than a continuous value, even if the values of bits within the lower-order portion independently change, the amount of change in values in the higher-order portion is dominant, so irregularity in the amount of change is suppressed over the entire region, and variance in the amount of change in values in the field is small.

Also, in splitting pattern candidates where a bit other than the highest-order bit in the continuous value field is indicated as the start bit position, overflow or underflow occurs when values change, and the value rapidly changes from a large value to a smaller value, or from a small value to a large value, so irregularity occurs in the amount of change of values, and the variance is great.

Note that the counter field is not included in the second payload splitting pattern candidate, so no overflow or underflow occurs in splitting pattern candidates indicating a region that starts from the highest-order bit of the continuous value field.

Based on this line of thinking, splitting pattern candidates that indicate the region of a continuous value are narrowed down by finding splitting pattern candidates with a relatively smaller variance in change of values within the region, out of the second payload splitting pattern candidates, i.e., out of the splitting pattern candidates remaining at the point of starting continuous-value field extracting processing.

The continuous-value field extracting processing is roughly divided into processing to identify the start bit position of the field, which is illustrated in FIG. 16, and processing to identify the bit length of the field, which is illustrated in FIG. 17. First, identifying the start bit position of the field will be described with reference to FIGS. 16, 18A, and 18B.

Step S161: The third feature of each splitting pattern candidate, i.e., an outlier score indicating the degree of outlying in the variance in the amount of change, as compared with other splitting pattern candidates having the same bit length, regardless of the start bit position. This process will be described by way of a specific example illustrated in FIGS. 18A and 18B.

In the table in FIG. 18A, the start bit positions of the splitting pattern candidates are shown in the rows and the bit lengths in the columns, with the variance in change of amount (third feature) calculated in step S13 regarding each splitting pattern candidate being listed in the cells. Note that cells including values of the third feature in this table are splitting pattern candidates in the table in FIG. 14 from which splitting pattern candidates, determined to indicate regions of other category (i.e., constant value or counter) fields, have been deleted via steps S14 and S15. Listing of the first feature and second feature has been omitted to facilitate viewing. The payload splitting unit 140 starts the processing of step S161 on such data.

Referencing the table in FIG. 18A, the variance in the amount of change is 1 for a splitting pattern candidate of which the start bit position is 11 and the field length is 1, for example. In the same way, the variances in the amount of change are respectively 1, 10, and 100, for splitting pattern candidates of which the start bit position is 11 and the bit lengths are 2, 8, 13, and 14. The variances in the amount of change are respectively 1, 2, 15, and 150, for splitting pattern candidates of which the start bit position is 12 and the bit lengths are 1, 2, 8, and 13. A splitting pattern candidate of which the start bit position is 12 and the bit length is 14 has already been deleted in either step S14 or S15, since determination has already been made that the 25th bit is already a constant value or counter field, and is not included in the second payload splitting pattern candidates. This is true for the other splitting pattern candidates of which the cells have been crossed out as well. The variances in the amount of change are respectively 1 and 2 for splitting pattern candidates of which the start bit position is 23 and the bit lengths are 1 and 2, and the variance in the amount of change is 1 for a splitting pattern candidate of which the start bit position is 24 and the bit length is 1.

The final row lists the average value of the variance in the amount of change, for each splitting pattern candidate of the same bit length that the payload splitting unit 140 calculates in the processing in step S161. That is to say, the averages of variance in amount of change for the splitting pattern candidates of which the bit lengths are 1, 2, 8, 13, and 14, respectively are 1, 1. 80. 125, and 100.

Next, the payload splitting unit 140 calculates outlier scores, indicating how far outlying the third features of each of the splitting pattern candidates illustrated in the table in FIG. 18A are, among the third features of splitting pattern candidates of the same bit length. The payload splitting unit 140 can calculate an outlier score using statistical or machine learning techniques. For example, assuming that the third feature of the splitting pattern candidates follow a normal distribution, calculation may be made based on the frequency of occurrence of the third feature, or an outlier detection algorithm such as k-nearest neighbors, Local Outlier Factor, or the like.

An example of scoring the lowness of occurrence probability when assuming that an occurrence frequency p of the third feature in each splitting pattern candidate follows a normal distribution in each bit length is illustrated here. p is a probability density function of normal distribution where an average m of variance and variance v in the same bit length are the average and variance. p can be calculated by the following Expression 1, where the third feature of splitting pattern candidates is represented by F2.

$$p(F2)=\{1/(2\pi v)^{\wedge}(1/2)\}\exp\{-(F2-m)^{\wedge}2/2v\} \quad \text{(Expression 1)}$$

The average that the payload splitting unit 140 obtains is the average of the third features of the splitting pattern candidates having the same bit length out of the splitting pattern candidates, and variance can be further obtained using this average obtained above. The score is calculated by −Log(p). The cells in the table in FIG. 18B show the scores calculated in this way.

Referencing FIG. 18B, the outlier scores of the splitting pattern candidates of which the start bit position is 11 and the bit lengths are 1, 2, 8, and 13, respectively are 0, 1, 4, 2. Note however, that no outlier score has been calculated for bit length 14, since there are no splitting patterns of a bit length of 14 in other splitting pattern candidates.

The greater the difference as to the average is, the greater the value of the outlier score is. With the case of bit length 8 as an example, the average variance is 80. The outlier score is 4 for the splitting pattern candidate of start bit position 11 where the average of variance in amount of change is 10, which is greater than the outlier score that is 3 for the splitting pattern candidate of start bit position 12 where the average of variance in amount of change is 15.

In a case where the calculated outlier scores are different indices according to bit length, the payload splitting unit 140 may make these to be the same index, by performing normalization or the like.

Step S162: The payload splitting unit 140 calculates the average of outlier scores obtained in step S161 (hereinafter referred to as average score), for each start bit position of the splitting pattern candidates. In the example in FIG. 18B, the average score is 4 for the splitting pattern candidates of which the start bit position is 11 and the bit lengths are 1 through 13 (including scores omitted from illustration in the FIG. 18B). In the same way, the outlier scores are respectively 0, 1, 3, and 2 for splitting pattern candidates of which the start bit position is 12 and the bit lengths are 1, 2, 8, and 13, and the average score of bit length 1 through 13 is 2. The outlier scores are respectively 0 and 0 for splitting pattern candidates of which the start bit position is 23 and the bit lengths are 1 and 2, and the average score is 0. The outlier score is 0 the for splitting pattern candidate of which the start bit position is 24 and the bit length is 1, and the average score is 0.

Note that in this example, description is made assuming that splitting pattern candidates having a bit length of 1 are to be processed by the payload splitting unit 140 in step S16, but an arrangement may be made where a smallest bit length is set beforehand for continuous value fields, with splitting pattern candidates shorter than this being excluded from being an object of processing beforehand. This is advantageous from the perspective of processing speed and splitting precision.

Step S163: The payload splitting unit 140 confirms whether or not there is a start bit position that satisfies the condition of the average score calculated in step S162 being equal to or above a predetermined threshold value. In a case where no start bit position satisfying this condition exists (case of NO), step S16 is ended, but if a start bit position satisfying this condition does exist, the flow advances to step S164.

Step S164: The start but position satisfying the condition in step S163 is identified to be the start bit position of a continuous value field. The payload splitting unit 140 identifies the bit length of the continuous value field in the subsequent steps shown in FIG. 17.

Step S165: The payload splitting unit 140 extracts, from the splitting pattern candidates indicating a start bit position satisfying the condition in step S163, splitting pattern candidates further indicating a bit length of a predetermined value. The predetermined value here is set based on an assumption that the bit length of the continuous value field will be at least long enough to be used to notify information, such as physical amounts measured by a sensor for example, and is 4 for example.

Step S166: The payload splitting unit 140 determines, with regard to the (Index, Length) that a splitting pattern candidate extracted in step S165 indicates, whether or not a splitting pattern candidate having the same start bit position and being even longer is a field including a value of a continuous value. The payload splitting unit 140 performs this determination using two conditions.

One condition is that the second feature of the splitting pattern candidate (Index+Length, 1), i.e., the occurrence frequency of change in value, is greater than the second feature of splitting pattern splitting pattern candidate (Index+Length−1, 1). That is to say, the condition is that the bit adjacent to the lowest-order side of the splitting pattern candidate extracted in step S165 is changing at a higher frequency than the value of the lowest-order bit in this splitting pattern candidate. This condition will hereinafter be referred to as a first condition.

The other condition is that the splitting pattern candidate indicating the region of (Index, Length+1) is undecided. That is to say, the condition is that the category of the splitting pattern candidate having the same start bit position as the splitting pattern candidate extracted in step S165 and that indicates a region one bit longer is undecided. This condition will hereinafter be referred to as a second condition.

In a case where the first condition and second condition are satisfied (case of YES), the payload splitting unit 140 advances to step S167, and otherwise (case of NO), the payload splitting unit 140 advances to step S168.

Step S167: The payload splitting unit 140 increments the value of Length. Thereafter, step S166 is executed again.

Determination is made in steps S166 and S167 regarding whether a continuous value is expressed in a region of a longer bit count, and the maximally longest bit length expressing a continuous value is identified. In a case where the conditions in step S166 are not satisfied, the payload splitting unit 140 advances to step S168.

Step S168: The payload splitting unit 140 selects the splitting pattern candidate indicating the start position decided up to step S164 and indicating the bit length identified in step S166, as being a splitting pattern representing the continuous value. Other splitting pattern candidates that include bits included in the selected splitting pattern candidate are deleted. The payload splitting unit 140 also outputs the results of having selected the splitting pattern indicating the region of the continuous value field, and returns to step S163. The reason is to confirm whether there further are splitting pattern candidates at other start bit positions satisfying the predetermined conditions. Splitting pattern candidates still remaining after the result of step S163 are the above-described third payload splitting pattern candidates.

Figures 19, 20:
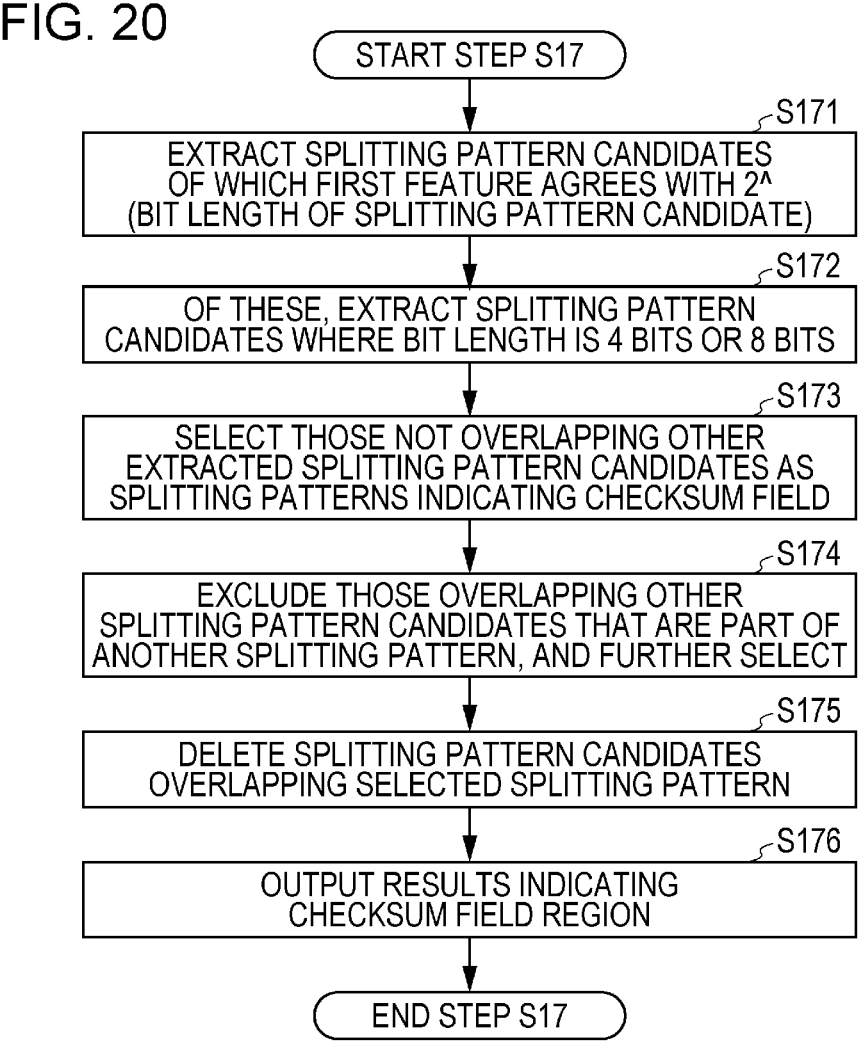
FIG. 19 is a diagram illustrating an occurrence frequency of change in values in the splitting pattern candidate values, used in an example of continuous-value field extracting processing according to the embodiment.
FIG. 20 is a flowchart of an example of checksum field extracting processing according to the embodiment.

The processing of identifying the bit length of a continuous value field, illustrated in FIG. 17, will be described using a specific example. In this example, a case is assumed where the start bit position has been identified as being 11 in step S164, and the predetermined value indicating the bit length in step S165 is 4. That is to say, the (Index, Length) of the region that the splitting pattern candidate extracted in step S165 indicates is (11, 4). FIG. 19 illustrates an excerpt of the second feature calculated in step S13. The table illustrated in FIG. 19 can also be said to be part of the data in the table illustrated in FIG. 14.

In this example, in step S166 the frequency of change in values is compared between the lowest-order bit of the region (11, 4) and the bit at an adjacent position to the lowest-order bit in this region. That is to say, the second feature of the one bit at the 15th bit (e.g., region (15, 1)) is compared with the second feature of the one bit at the 16th bit (e.g., region (16, 1)). It can be seen by referencing FIG. 19 that the second feature in region (15, 1) is 0.25, and the second feature in region (16, 1) is 0.28. Accordingly, the first condition is satisfied.

Further, whether the category has been decided regarding a region that is one bit longer in bit length than the region (11, 4), i.e., region (11, 5), is determined in step S166. For the sake of convenience, assumption will be made in this example that the category was undecided regarding this region, i.e., that the second condition also was satisfied (YES in step S166). Accordingly, the value of Length is incremented by an increment of 1 in step S167.

Assumption will be made that similar determination has continued, and that the Length has been incremented to 14. Now, the occurrence frequency of change in value at the region (24, 1) that is the lowest-order bit of the region (11, 25) is compared with that at region (25, 1). It can be seen by referencing FIG. 19 that the second feature in region (25, 1) is 0, and the second feature in region (24, 1) is 0.40. Accordingly, the first condition is not satisfied, so the result of determination in step S166 is NO.

Thus, the payload splitting unit 140 selects splitting patterns indicating a region of the continuous value field, based on the second feature and third feature. More specifically, splitting pattern candidates are extracted based on the third feature of the splitting pattern candidates, i.e., whether or not the variance on the amount of change is outlying from the average in the same bit length. Then, whether or not a splitting pattern candidate indicates a region for a field in the continuous value category is determined, based on the second feature of the splitting pattern candidate indicating the bits of the extracted splitting pattern candidate as a region, i.e., on the magnitude relation of the occurrence frequency of change.

Note that the processing step of selecting splitting pattern candidates indicating a region of the continuous value field is not restricted to that described above. For example, a splitting pattern candidate that indicates a start bit position identified in step S164, i.e., the outliner score is higher than a predetermined threshold value, may be selected as a splitting pattern indicating a region of the continuous value field. Note however, that performing the processing to identify the bit length that is illustrated in FIG. 17 enables selection to be performed with higher precision.

One reason for this is that regarding bit lengths having few splitting pattern candidates remaining at the stage of step S16 being executed, there are cases where reliability is low, such as a high outlier score being coincidental. Also, outlier score will be high when the higher-order portion is a continuous value and the lower-order portion is other than a continuous value such as described above, and there is a possibility of incorrectly extracting together as the continuous value field.

Also, the third feature, i.e., variance in the amount of change, may be compared in step S166 instead of or in addition to comparison of the second feature, as a technique to decide bit length. The reason is that there is nothing carried over unless the amount of change of a lower-order bit is great to a certain level, and change in a higher-order bit does not occur.

Further, a condition relating to difference in the second feature may be used to determine whether or not to extend the bit length in step S166, instead of or in addition to magnitude relation of the second feature, as another technique to decide bit length.

1.15 Checksum Field

FIG. 20 illustrates a flowchart of an example of checksum field extracting processing in step S17, by the payload splitting unit 140. Change in the values of the checksum field appear to be random, and the probability that occurrence of each value will be uniform is high, so it is conceivable that of the third payload splitting pattern candidates, a condition will be satisfied that the first feature is great to a certain extent with regard to the bit length. Additionally, prior knowledge that the bit length of the checksum often is four bits or eight bits long is also used in the conditions, and splitting pattern candidates satisfying these conditions are selected as splitting patterns indicating the region of the checksum field. The steps of this processing will be described below.

Step S171: The payload splitting unit 140 extracts, from the third payload splitting pattern candidates, splitting pattern candidates of which the first feature matches 2^(bit length of splitting pattern) or the number of records extracted from the reception log in step S11. That is to say, out of the records extracted in step S11, those where all values that can be expressed by the bit length of the splitting pattern candidates, or those where the values of all records are different, are extracted.

Step S172: Of the splitting pattern candidates extracted in step S171, the payload splitting unit 140 extracts splitting pattern candidates of which the bit length is four bits or eight bits.

Step S173: The payload splitting unit 140 selects, of the splitting pattern candidates extracted in step S172, those not overlapping with other splitting pattern candidates, as splitting patterns indicating a region of a field belonging to the checksum category.

Step S174: The payload splitting unit 140 excludes, out of the splitting patterns extracted in step S172 that overlap other splitting pattern candidates, those that are part of another splitting pattern candidate, and further selects these as splitting patterns indicating a region of a field belonging to the checksum category. This is a step performed to find the longest bit string satisfying the conditions used in steps S171 and S172, as a single checksum field.

Step S175: The payload splitting unit 140 deletes other splitting pattern candidates that overlap the splitting pattern candidates selected in steps S173 and S174, i.e., that include bits included in the selected splitting pattern candidates. Step S175 is a step similar to steps S144 and S145, so detailed description will be omitted.

Step S176: The payload splitting unit 140 outputs the results of having selected the splitting pattern indicating the region of the checksum field, and ends step S17.

Note that various types of modifications may be made to the contents of processing in the above steps. For example, although conditions that are common with step S151 are used in the above step S171, but these may be looser conditions. For example, conditions may be used that the first feature is 80% or more of 2^(bit length of splitting pattern) or the number of records extracted from the reception log in step S11. The reason is that the number of patterns of change in values in the checksum field is irregular as compared to the counter field, and that there is a high probability that duplication will occur in values shown and the number of types will be few.

Also, the bit length of 4 bits or eight bits in step S172 is an example, and the size of the bit length and the number of bit lengths included in the conditions used in this step are not restricted to these. Also, in a case of extracting splitting pattern candidates with multiple bit lengths, splitting pattern candidates with longer bit lengths may be extracted with priority.

1.16 Status Field

Figure 21:
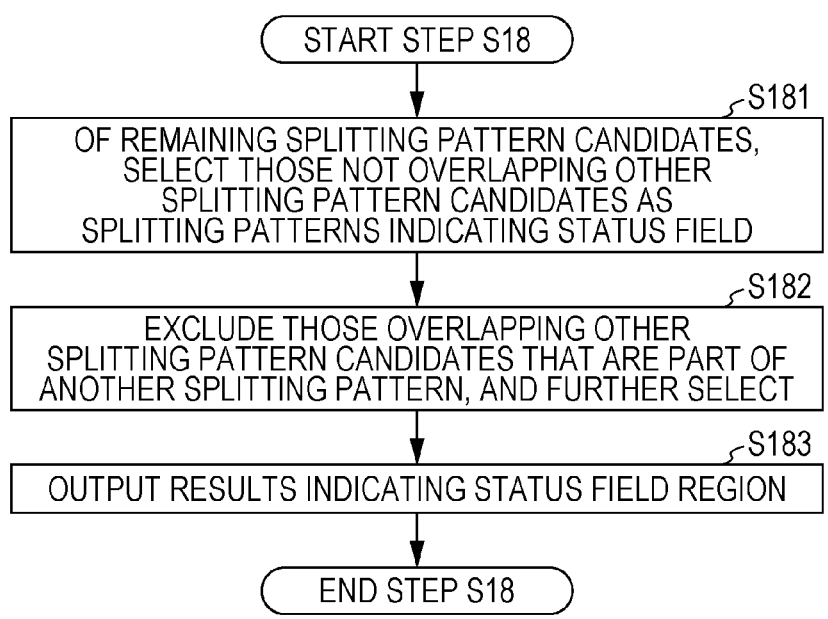
FIG. 21 is a flowchart of an example of status field extracting processing according to the embodiment.

FIG. 21 illustrates a flowchart of status field extracting processing.

Step S181: The payload splitting unit 140 selects, out of splitting pattern candidates still remaining after step S17 ending, those not overlapping other splitting pattern candidates, as splitting patterns indicating a region of a field belonging to the status category.

Step S182: The payload splitting unit 140 excludes, out of the splitting patterns extracted in step S181 that overlap other splitting pattern candidates, those that are part of another splitting pattern candidate, and further selects these as splitting patterns indicating a region of a field belonging to the status category. This is a step performed to find the longest bit string as a single status field.

Step S183: The payload splitting unit 140 outputs the results of having selected the splitting pattern indicating the region of the status field, and ends step S18.

Thus, the data field splitting processing, performed by the payload splitting unit 140 executing step S13 through step S18 illustrated in FIG. 11, described in 1.11, ends. Upon this series of steps being executed with regard to data fields included in one type of data frame having a common ID, the payload splitting unit 140 returns to step S12, and executes the data field splitting processing with regard to data fields included in data frames of another unprocessed ID.

Upon splitting of data fields included in the data frames of the types indicated by the IDs being completed, the results output in steps S143, S156, S168, S176, and S183 (also referred to as field extracting results), are stored in memory of the monitoring ECU 100 as the ID, and the information of start, length, and category in information relating to the data field, out of the data included in the table in FIG. 7, for example.

The monitoring ECU 100 transitions to processing of generating a normal model (step S9), which is carried out by the feature extracting unit 150 using the information of the field extracting results. A normal model indicates a normal range of change in the values of the fields, and is used for anomaly determination of data frames, for example. The processing of the feature extracting unit 150 generating a normal model will be described below.

1.17 Processing by Feature Extracting Unit 150

Figure 22:
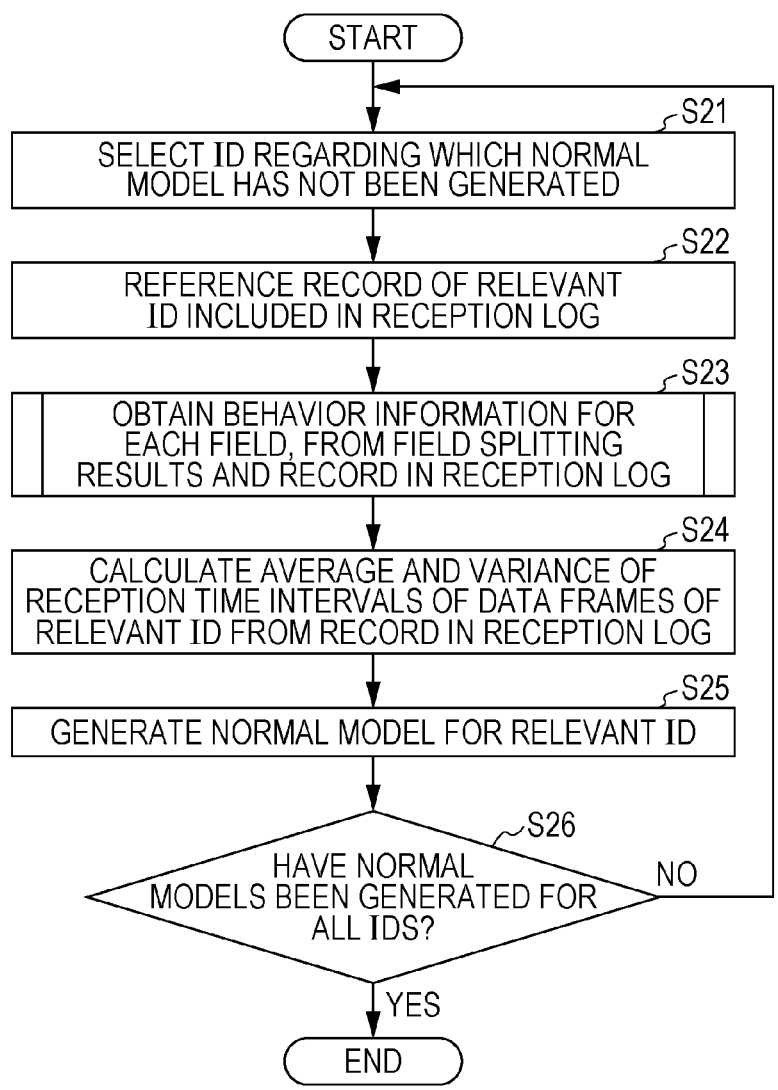
FIG. 22 is a flowchart of an example of normal model generation processing according to the embodiment.

A series of steps that the feature extracting unit 150 executes in the processing of generating a normal model will be described with reference to the flowchart illustrated in FIG. 22.

Step S21: The feature extracting unit 150 selects, out of IDs indicated by field splitting results that are output from the payload splitting unit 140, an ID regarding which a normal model has not been generated.

Step S22: The feature extracting unit 150 references the record of the ID selected in step S21, included in the reception log stored in the reception log storing unit 190.

Step S23: The feature extracting unit 150 obtains behavior information for each field, from the field splitting results and the record in the reception log. Processing for obtaining behavior information will be described later by way of a separate flowchart.

Step S24: The feature extracting unit 150 calculates the average reception interval of data frames of this ID, and variance in the reception intervals, from the record in the reception log.

Step S25: The feature extracting unit 150 generates and outputs a normal model for this ID, based on the field splitting results and the information obtained in steps S23 and S24, and stores this in the normal model storing unit 191.

Step S26: The feature extracting unit 150 confirms whether normal models have been generated for all IDs. If normal models have been generated for all IDs (case of YES), step S9 ends. Otherwise (case of NO), the flow returns to step S21.

Figure 23:
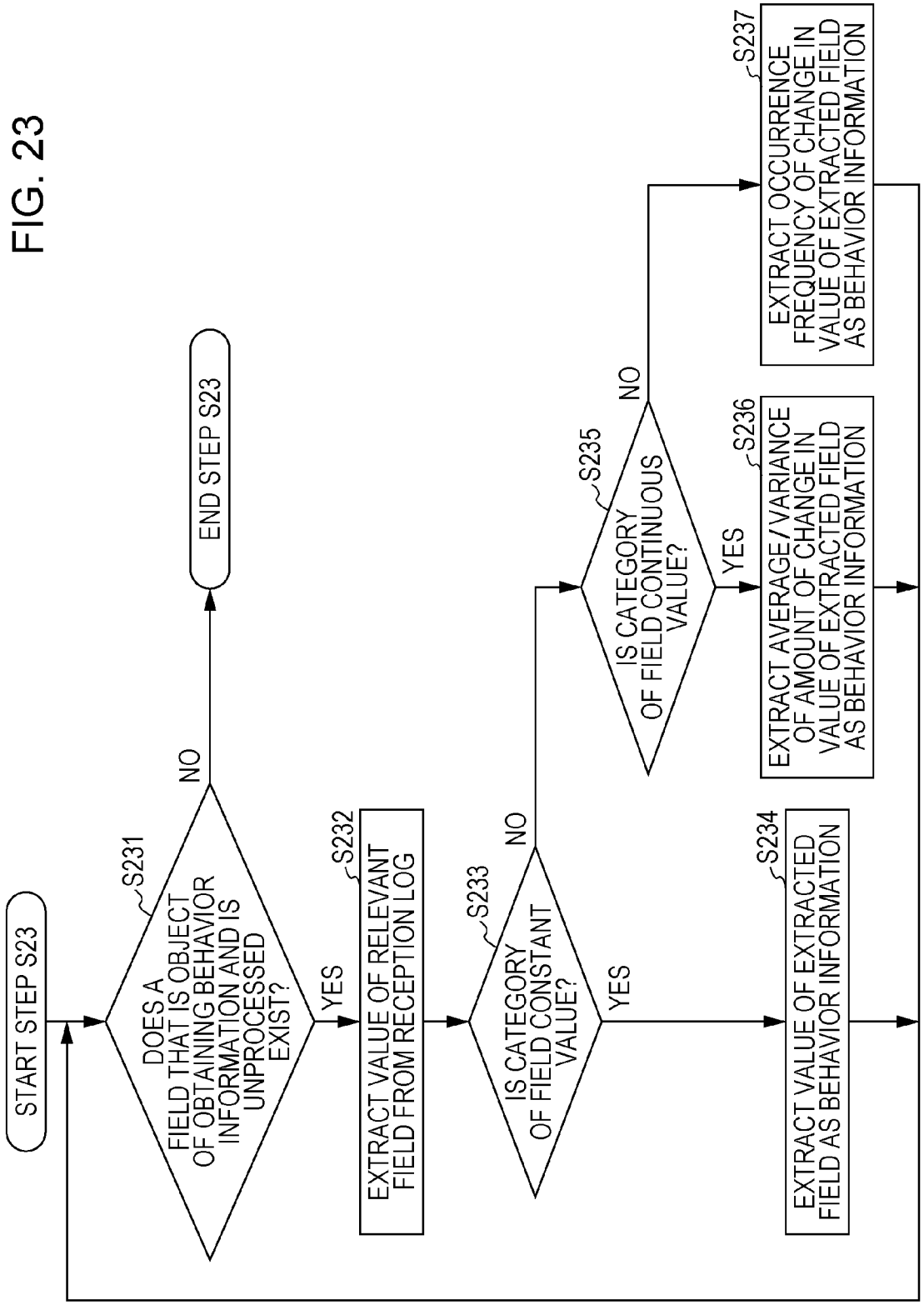
FIG. 23 is a flowchart of a processing example of obtaining behavior information contained in the normal model generation processing illustrated in FIG. 22.

FIG. 23 is a flowchart of a processing example of obtaining behavior information, which the feature extracting unit 150 executes in step S23.

Step S231: The feature extracting unit 150 confirms whether or not an unprocessed field, belonging to a category that is the object of obtaining behavior information, is included in a category of a field indicated in the field splitting results. Categories that are the object of obtaining behavior information are constant value, continuous value, and status. In a case where no field that is the object of obtaining behavior information and that is unprocessed exists (case of NO), the feature extracting unit 150 ends step S23. In a case where a field that is the object of obtaining behavior information and that is unprocessed does exist (case of YES), the feature extracting unit 150 advances to step S232.

Step S232: The feature extracting unit 150 extracts, from the reception log stored in the reception log storing unit 190, the values of fields of a category that is the object of obtaining behavior information and that are unprocessed, confirmed in step S231.

Step S233: The feature extracting unit 150 confirms whether or not the category of this field is constant value. In a case where the category of this field is constant value (case of YES), the feature extracting unit 150 advances to step S234. Otherwise (case of NO), the feature extracting unit 150 advances to step S235.

Step S234: The feature extracting unit 150 extracts and obtains the value of the extracted field as behavior information, and returns to step S231.

Step S235: The feature extracting unit 150 confirms whether or not the category of this field is continuous value. In a case where the category of this field is continuous value (case of YES), the feature extracting unit 150 advances to step S236. Otherwise (case of NO), the feature extracting unit 150 advances to step S237.

Step S236: The feature extracting unit 150 extracts and obtains the average and variance in amount of change of the value of the extracted field as behavior information, and returns to step S231. This average and variance in amount of change is the third feature calculated regarding splitting pattern candidates indicating the region of this field in step S13, but may be calculated by the feature extracting unit 150 again in this step.

Step S237: The feature extracting unit 150 extracts and obtains the occurrence frequency in change of the value of the extracted field as behavior information, and returns to step S231. This occurrence frequency is the second feature calculated regarding splitting pattern candidates indicating the region of this field in step S13, but may be calculated by the feature extracting unit 150 again in this step.

1.18 Operation Example of Feature Extracting Unit 150

Figure 24:
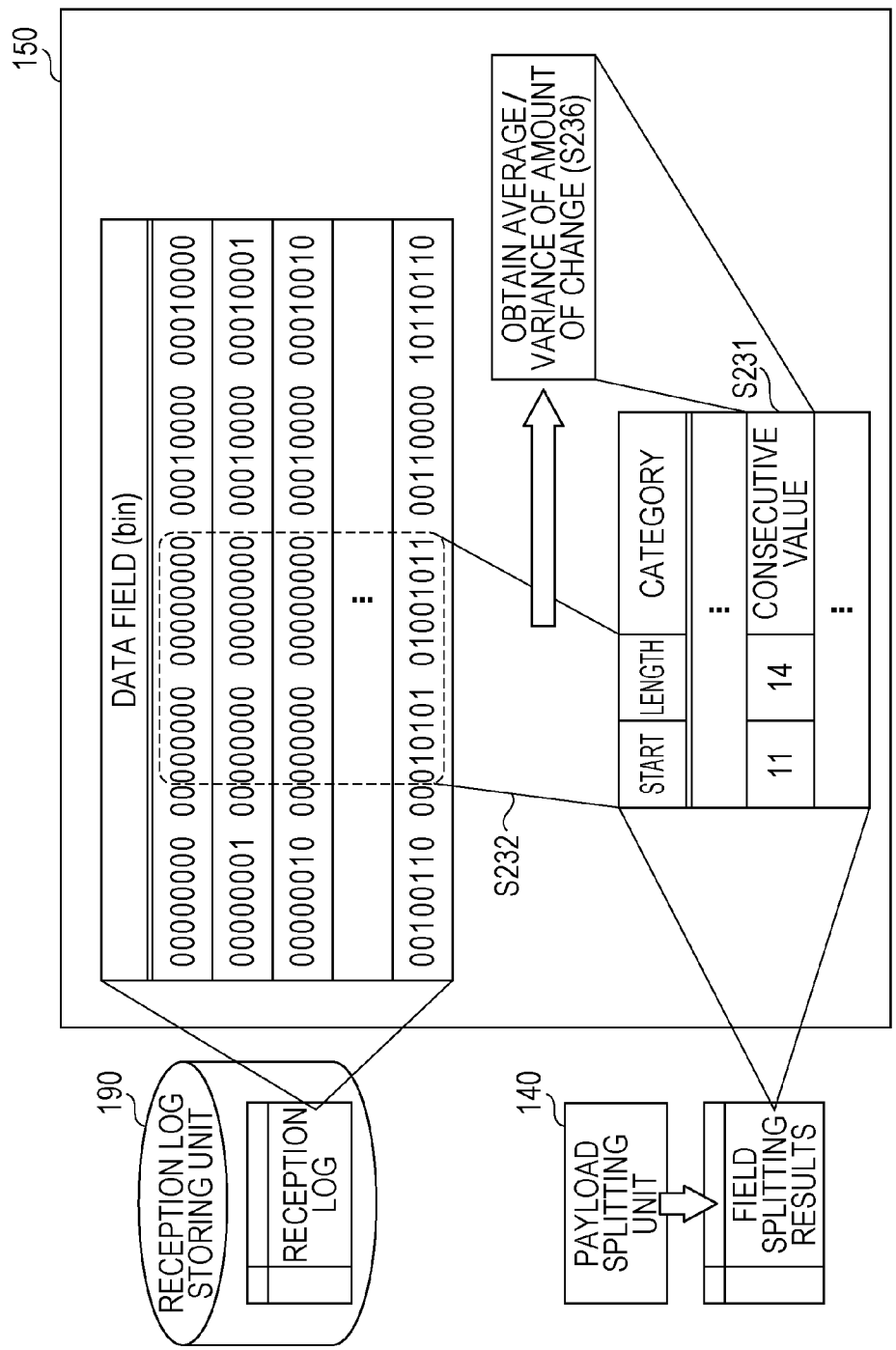
FIG. 24 is a diagram for describing part of feature extracting operations where the processing of obtaining behavior information illustrated in FIG. 23 is executed.

FIG. 24 is a diagram illustrating an example for describing a part of the operations of the feature extracting unit 150 executing the processing of the flowchart illustrated in FIG. 23. It can be seen from FIG. 24 that the feature extracting unit 150 confirms whether or not a field that belongs to a category that tis the object of obtaining behavior information and that is unprocessed is included in the field splitting results output from the payload splitting unit 140 (step S231). In this example, determination is made as the result of confirmation that the continuous value category is included.

Next, the feature extracting unit 150 obtains the values of the field of the category which has been confirmed to exist in step S231, from the reception log stored in the reception log storing unit 190 (step S232). In this example, values are obtained from the field where the start bit position is 11, and the bit length is 14. The category of this field is a continuous value in this example (steps S233, S235), so the feature extracting unit 150 extracts behavior information by obtaining the average and variance in amount of change of the values of the field (step S236). If the category is constant value, the value of the field itself obtained in step S232 is obtained, and if status, the occurrence frequency of change in the value of the field is obtained.

The feature extracting unit 150 also calculates and obtains statistical information relating to reception intervals of data frames of the same ID (average reception interval, variance). Thus, the feature extracting unit 150 generates and outputs a normal model such as exemplified in FIG. 7, using the obtained information and field splitting results (step S25), and stores this in the normal model storing unit 191.

1.19 Flowchart of Processing by Anomaly Detection Unit 160

The series of steps executed by the anomaly detection unit 160 in anomaly detection processing (step S4 in FIG. 8) carried out using a normal model will be described with reference to the flowchart illustrated in FIG. 25.

Step S31: The anomaly detection unit 160 references a corresponding normal model stored in the normal model storing unit 191, with regard to the ID of a data frame received from the bus 300.

Step S32: The anomaly detection unit 160 references a corresponding reception log stored in the reception log storing unit 190, with regard to the ID of the received data frame.

Step S33: The anomaly detection unit 160 verifies the data field included in records in the reception log being referenced, using behavior models of the fields included in the normal model. Verification processing based on behavior models will be described later with reference to a separate flowchart.

Step S34: In a case where an anomaly has been detected as the result of verification (case of YES), the anomaly detection unit 160 advances to step S35. Otherwise (case of NO), the anomaly detection processing ends.

Step S35: The anomaly detection unit 160 requests the frame generating unit 170 to generate a data frame for notifying the other ECUs of the anomaly, and ends the anomaly detection processing.

Figure 26:
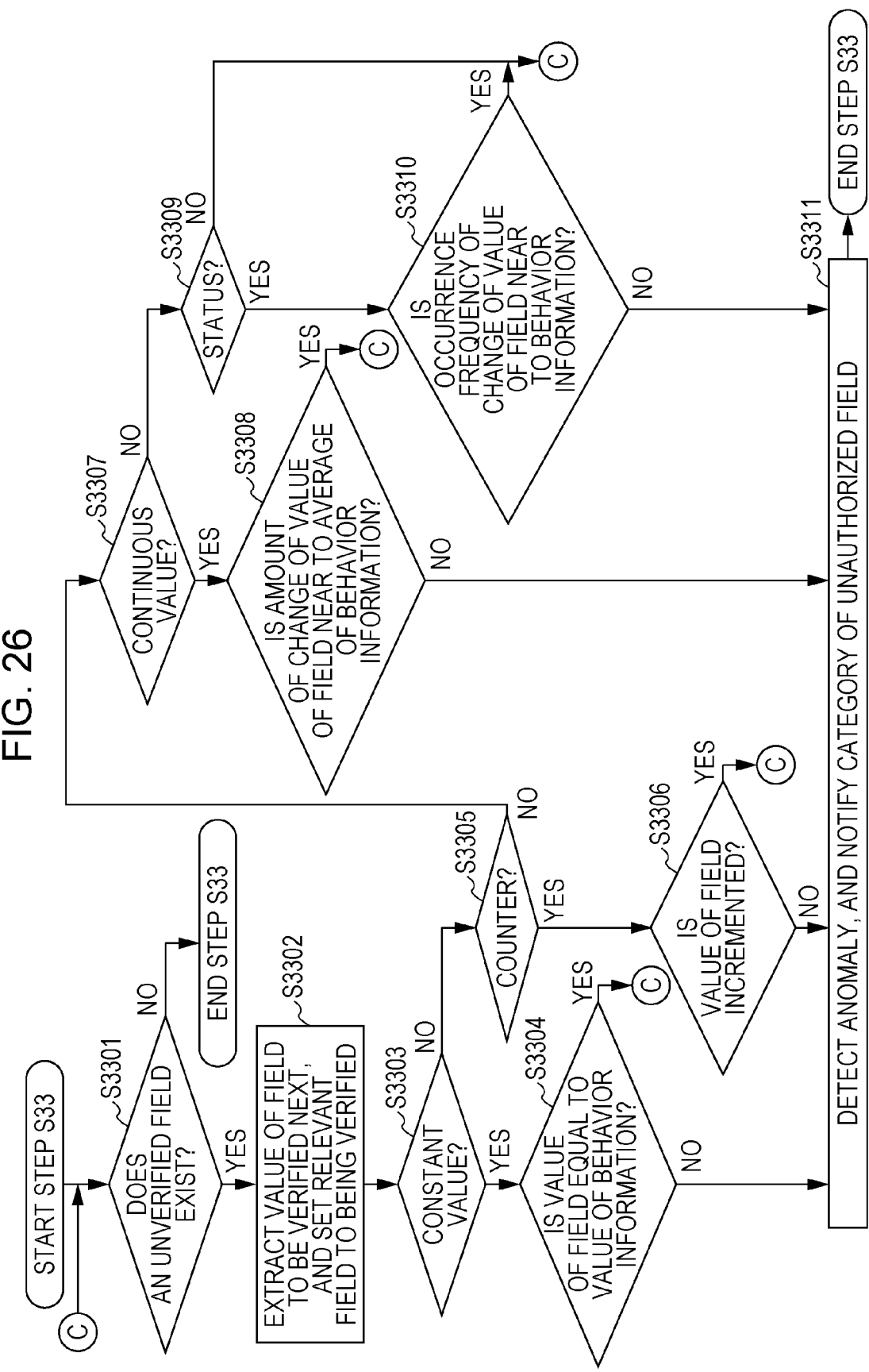
FIG. 26 is a flowchart illustrating an example of processing by the anomaly detection unit according to the embodiment.

FIG. 26 is a flowchart of a processing example of verification based on behavior models, which the anomaly detection unit 160 executes in step S33.

Step 3301: The anomaly detection unit 160 judges whether there is an unverified field in the data field of the received data frame. If no unverified field exists, i.e., in a case where verification of all fields has been completed (case of NO), step S33 is ended. In a case where an unverified field exists (case of YES), the flow advances to S3302.

Step S3302: The anomaly detection unit 160 extracts the value of the field to checked next, from the reception log stored in the reception log storing unit 190, and sets this field to verified.

Step S3303: The anomaly detection unit 160 judges whether or not the category of the extracted field is constant value. In a case of constant value (case of YES), the anomaly detection unit 160 advances to step S3304. If not constant value (case of NO), the anomaly detection unit 160 advances to step S3305.

Step S3304: The anomaly detection unit 160 confirms whether the value of the extracted field is equal to the value in the behavior information of the normal model stored in the normal model storing unit 191. In a case where this is equal to the value in the behavior information of the normal model (case of YES), the anomaly detection unit 160 returns to step S3301. Otherwise (case of NO), the anomaly detection unit 160 advances to step S3311.

Step S3305: The anomaly detection unit 160 judges whether or not the category of the extracted field is counter. In a case of counter (case of YES), the anomaly detection unit 160 advances to step S3306. If not counter (case of NO), the anomaly detection unit 160 advances to step S3307.

Step S3306: The anomaly detection unit 160 confirms whether the value of the extracted field is incremented in time-sequence order. In a case of being incremented in time-sequence order (case of YES), the anomaly detection unit 160 returns to step S3301. Otherwise (case of NO), the anomaly detection unit 160 advances to step S3311.

Step S3307: The anomaly detection unit 160 judges whether or not the category of the extracted field is continuous value. In a case of continuous value (case of YES), the anomaly detection unit 160 advances to step S3308. If not continuous value (case of NO), the anomaly detection unit 160 executes step S3309.

Step S3308: The anomaly detection unit 160 confirms whether the value of the extracted field is a value near to the value in the behavior information of the normal model stored in the normal model storing unit 191. In a case where this is a value near to the value in the behavior information of the normal model (case of YES), the anomaly detection unit 160 returns to step S3301. Otherwise (case of NO), the anomaly detection unit 160 advances to step S3311.

Step S3309: The anomaly detection unit 160 judges whether or not the category of the extracted field is status. In a case of status (case of YES), the anomaly detection unit 160 advances to step S3310. If not continuous value (case of NO), the anomaly detection unit 160 advances to step S3301.

Step S3310: The anomaly detection unit 160 confirms whether the occurrence frequency of change of the value of the extracted field is near to the occurrence frequency of change of the value in the behavior information of the normal model stored in the normal model storing unit 191. In a case where this is near to the occurrence frequency of change in the behavior information of the normal model (case of YES), the anomaly detection unit 160 returns to step S3301. Otherwise (case of NO), the anomaly detection unit 160 advances to step S3311.

Step S3311: The anomaly detection unit 160 notifies the unauthorized field category to the next step, to the effect that an anomaly has been detected, and ends processing of verifying based on behavior model (executes step S34).

Figure 25:
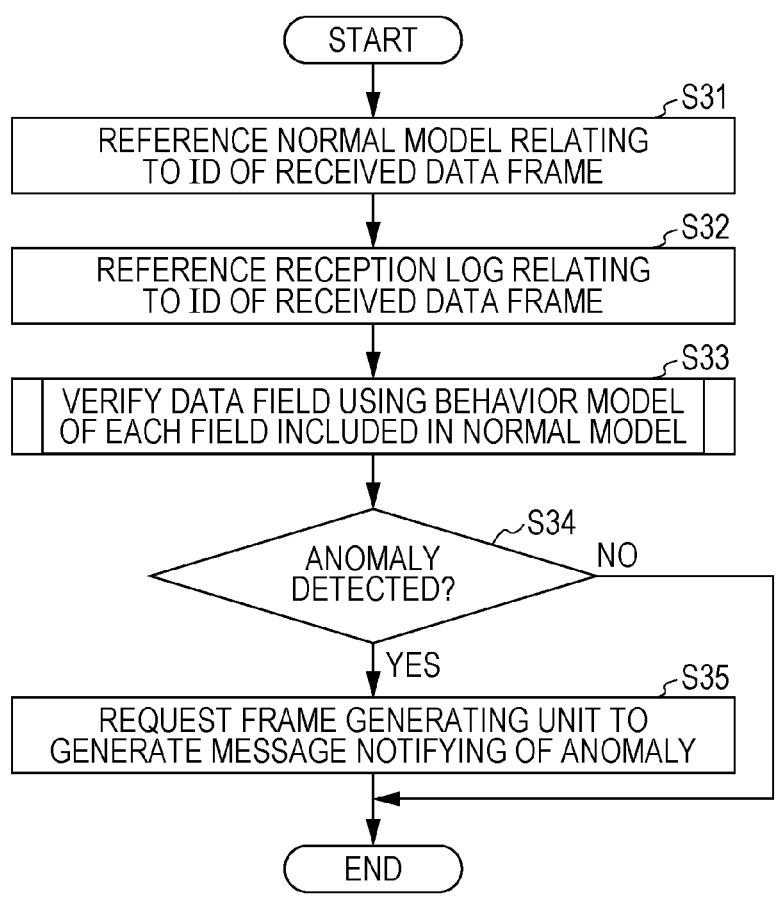
FIG. 25 is a flowchart illustrating an example of processing by an anomaly detection unit according to the embodiment.

Although verification based on average and variance of reception intervals of data frames included in the normal model is not included in the flowcharts in FIGS. 25 and 26, this is performed separately by the anomaly detection unit 160. The anomaly detection unit 160 may execute determination regarding whether or not there is an anomaly in reception intervals among data frames having the relevant ID, or the height of probability thereof, before step S33 in the anomaly detection processing illustrated in FIG. 25, for example, and subject the data field of a data frame that is anomalous, or has a high probability of being anomalous, to the verification in step S33.

A specific example will be described below regarding operations of the monitoring ECU 100 including the above-described components detecting an anomaly, in a case where an unauthorized ECU that sends anomalous frames is connected to the onboard network 10.

1.20 First Operation Example of Anomaly Detection Unit 160

Figure 27:
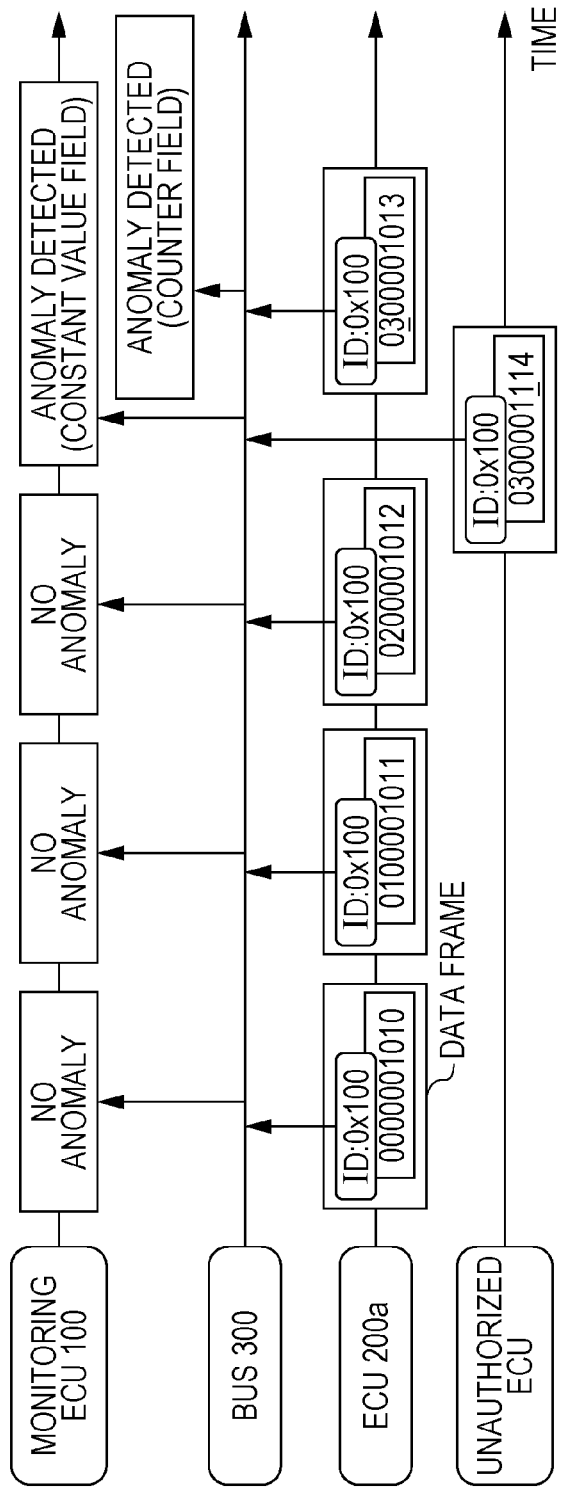
FIG. 27 is a diagram illustrating a first operation example of the anomaly detection unit according to the embodiment.

FIG. 27 illustrates an example of operations of the anomaly detection unit 160. Assumption is made in this example and the following examples that the monitoring ECU 100 stores the normal model illustrated in FIG. 7, in its normal model storing unit 191. It can be seen by referencing FIG. 27 that the ECU 200*a* periodically transmits a data frame of ID 0×100, indicating vehicle speed, to the bus 300. However, an unauthorized ECU transmits a data frame pf ID 0×100 to the bus 300.

The monitoring ECU 100 references the normal model stored in the normal model storing unit 191 and the reception log stored in the reception log storing unit 190 each time a data frame is received, thereby judging whether values of the data field are deviant from the normal model (step S33). Note that in FIGS. 27 through 29, 5-byte data field values are expressed in hexadecimal.

The first three data frames that have been received are determined to have no anomaly, since the data field values match the normal model. However, the data field received the fourth time is detected to have an anomaly regarding the constant value field, based on not matching a field having a start bit position of 29 and a data length of 4 being a constant value, and the value being 0, indicated in the normal model (YES in step S3303, NO with regard to the underlined "1" in S3304, S3311).

Also, an anomaly is detected regarding the data frame received the fifth time, due to judgement that the value of the counter field of which the start bit position is 1 and the bit length is 8 has not been incremented, due to the data frame transmitted from the unauthorized ECU that was received immediately before (YES in step S3305, NO with regard to the underlined "3" in S3306, S3311). The ID of the data frame regarding which an anomaly has been detected, and information based on the category of the field regarding which an anomaly has been detected (anomaly in constant value field and anomaly in counter field) is notified to the frame generating unit 170, to request generation of a message for notification of the occurrence of anomaly to the other ECUs (step S35). Note that in a case of having detected an anomaly in a data frame, the monitoring ECU 100 may delete the record of this data frame from the reception log.

1.21 Second Operation Example of Anomaly Detection Unit 160

Figure 28:
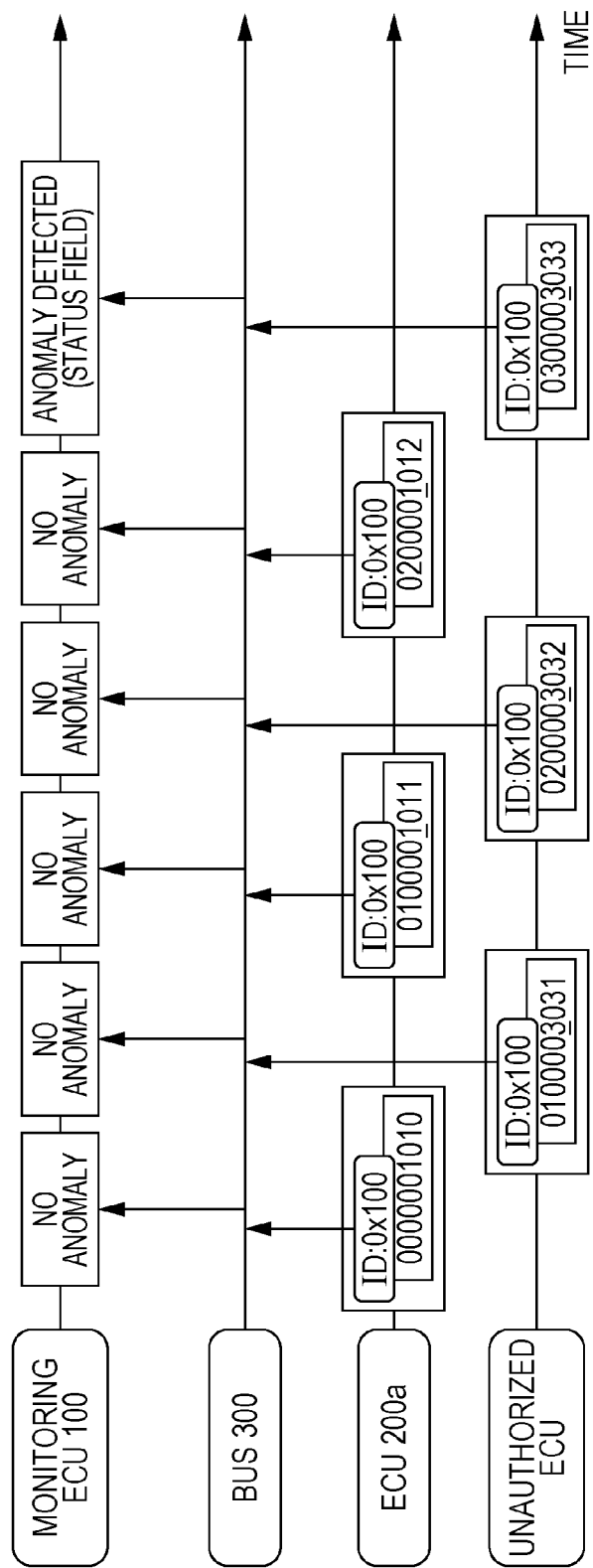
FIG. 28 is a diagram illustrating a second operation example of the anomaly detection unit according to the embodiment.

FIG. 28 illustrates another example of operations of the anomaly detection unit 160. The same situation as that illustrated in FIG. 27 is assumed in this example, except for the data frames that the unauthorized ECU transmits. In this example, the unauthorized ECU transmits a data frame including an anomaly, immediately after a normal data frame is transmitted from the ECU 200*a*. The monitoring ECU 100 the anomaly based on the occurrence frequency of change of the status field, of which the start bit position is 26 and the bit length is 3, being far removed from the 0.0001 indicated by the normal model, in multiple data frames sequentially received for a predetermined duration (YES in step S3309, NO with regard to the underlined values in S3310, S3311).

Although anomaly is also detected regarding the counter field, in the same way as with the example in FIG. 27, description thereof will be omitted in this example.

1.22 Third Operation Example of Anomaly Detection Unit 160

FIG. 29 illustrates an operation example of the anomaly detection unit 160. The same situation as that illustrated in FIGS. 27 and 28 is assumed in this example, except for the data frames that the ECU 200a transmits and data frames that the unauthorized ECU transmits.

After three data frames of ID 0×100 are transmitted from the ECU 200a, the unauthorized ECU transmits a data frame containing an anomaly, of ID 0×100. The monitoring ECU 100 that has received this data frame detects an anomaly based on the amount of change from the data frame received immediately prior regarding the continuous value field extracted from the reception log being 481 (0×157C−0× 139B=0×1E1), which is markedly different from the behavior information of the continuous value field of which the start bit position is 11 and bit length is 14, where the average of the amount of change is 10 and variance in the amount of change is 100 (YES in step S3307, NO with regard to the amount of change of the underlined value in S3308, S3311).

Although anomaly is also detected regarding the counter field, in the same way as with the example in FIG. 27, description thereof will be omitted in this example.

1.23 Advantages

According to the present embodiment, the monitoring ECU 100 monitors data frames flowing over the onboard network, and splits data fields included in data frames into fields, which are meaningful bit string groups, based on statistically-obtained features. The monitoring ECU 100 also generates normal models used for detecting anomalies in the fields obtained by splitting. Further, the monitoring ECU 100 can detect unauthorized activity on the onboard network by execution of anomaly detecting using normal models.

Thus, the monitoring ECU 100 does not need individual design beforehand even in onboard network systems of different specifications, thereby enabling protection of onboard networks with suppressed costs.

2. Modifications

Although the present disclosure has been described based on the above embodiment, the present disclosure is not restricted to the above embodiment, and the following configurations are included in the technical scope of the present disclosure.

(1) Although description has been made in the above embodiment that the payload splitting unit, feature extracting unit, and anomaly detection unit are components of the monitoring ECU, there is no need for the same device to have all components. For example, the payload splitting unit and feature extracting unit may be components of a cloud server outside of the vehicle, with the cloud server splitting data frames flowing over the onboard network system, received via a wireless communication network such as a cellular telephone network or the like to which the onboard network system can connect, and generating a normal model. The monitoring ECU may then execute anomaly detection processing using the normal model downloaded from the cloud server. In this case, the monitoring ECU does not have to have an operation judgement unit, and it is sufficient to constantly perform anomaly detection processing. Accordingly, the monitoring ECU only needs to have the anomaly detection unit, thereby making implementation easier.

Also, although the monitoring ECU performs splitting of data fields, generating of normal models and anomaly detection processing, the present disclosure can be realized as an information processing device, information processing method, or program, or the like, that only performs splitting of these data fields, or up to generating of normal models, for example. Such an information processing device and so forth can be applied for developing a network monitor device, for example.

(2) Although a normal model is generated from a reception log of having collected data frames of the onboard network for a predetermined period in the above-described embodiment, there is no particular need to collect data frames from the onboard network for a predetermined period in order to generate a normal model. For example, a normal model may be generated using logs collected in the past as input. Also, an arrangement may be made where normal models are generated regarding each of multiple logs, and then the multiple normal models are merged by majority vote or averaging, the results of which are a final normal model. This is effective in a case where anomaly detection processing is desired to be realized quickly in a great number of automobiles, without the necessity of collecting data frames for a predetermined period before starting network monitoring.

(3) Although an example has been described in the above embodiment where a message including the ID of a data frame regarding which an anomaly has been detected, and the type of field where the anomaly has been detected, i.e., a data frame, is transmitted as an action in a case of having detected an anomaly for the purpose of anomaly notification, actions following detection of an anomaly are not restricted to this. For example, an arrangement may be made where the monitoring ECU transmits an error frame at the point of having detected an anomaly, thereby invalidating the data frame including the field where the anomaly has been detected. The anomaly detection processing illustrated in FIG. 25 is performed at the monitoring ECU while receiving the data frame. Also, the function of the monitoring ECU may be added to a gateway ECU on the onboard network, thereby handling the situation by not transferring the data frame where the anomaly has been detected. Alternatively, transfer of data frames of the same type as the data frame where the anomaly has been detected, i.e., data frames of a common ID, may be stopped. This is effective in a case where realizing the present disclosure using a gateway ECU as the monitoring ECU is desired, and further is advantageous in that the scope of functions that can be realized is broader, since information of a great number of onboard networks can be monitored.

Also, the user may be notified that an anomaly has occurred, the vehicle may be transitioned to a fail-safe mode, the anomaly that has occurred may be logged, and transmission may be made to a cloud server regarding the anomaly that has occurred via a cellular telephone network or the like. This enables flexible handling after detection of an anomaly. For example, the cloud server may provide information relating to this anomaly to onboard networks of the same model or same version as the onboard network where the anomaly has been detected, or to onboard networks including a common ECU.

(4) Although an example has been described with standard format IDs in the above embodiment, this may be the extended ID format.

(5) Although normal model generation was performed in the operating mode after one hour in the collection mode in the above-described embodiment, this may be shorter than one hour, or longer. Also, a size may be stipulated for the log that is sufficient to extract features, regardless of time, with the normal model being generated at the point in time that log collection of this size has been performed. An external interface may be provided, with the mode being switched by user instructions. For example, the mode may be switched by instruction from a cloud server. Accordingly, data collection can be performed more flexibly, and operations can be performed in accordance with resources of the monitoring ECU.

(6) Although the reception log of data frames, normal model, and vehicle state correspond to a single ID in the above embodiment, each may be stored relating to one or more IDs.

Also, in a case where data frames do not have multiple types due to communication specifications, or even if there are multiple types but it is known that the payload data structure is in common, the ID does not need to be included in the reception log.

(7) Although an example has been described in the above embodiment where data frames flow in plaintext, these may be encrypted. Also, the data frames may include a Message Authentication Code.

(8) Although an example has been described in the above embodiment where the normal models and reception logs are stored in plaintext, these may be encrypted and stored.

(9) Although an example has been described in the above embodiment where the data is stored in the data field according to the big-endian format, but data may be stored according to the little-endian format.

(10) Although an example has been described in the above embodiment where the average and variance of reception intervals of data frames are stored for each ID as a normal model, an arrangement may be made where an anomaly in a message is detected in a case where the reception intervals of actually-received data frames are deviated from the average of reception intervals described in the normal model by more than the variance of reception intervals in anomaly detection processing. This enables not only detection of anomalies using field values but also of anomalies using message time information, so anomalies can be detected from multiple approaches, which is effective in further raising detection precision.

Although the reception times of data frames are recorded in the reception log, the reception time does not have to be included in the reception log as if features can be extracted using only order, without using reception intervals between data frames. The order of reception may be indicated using the order of array of records in the reception log, or a serial number.

In a case where information of average and variance of reception intervals is not used for anomaly detection, these do not have to be stored in the normal model.

(11) Although split fields have been described in the above embodiment as being classified into the five categories of constant value, counter, continuous value, status, and checksum, classification does not necessarily have to be made into these five categories. For example, fields of categories unnecessary for anomaly detection do not have to be included in the normal model.

Also, the checksum field may be a message identifier field.

Also, these five categories do not all need to be distinguished from each other. For example, a field in a region where change of a predetermined magnitude or less is observed a predetermined number of times or more within a predetermined duration may be handled as a field of one category. Such a field can include a counter or continuous value, and is an example of a first category in the present modification. As a separate example, a field of a region having a discreet value from various types of features may be handled as one category. Such a field can include a checksum, a flag, or a status value indicating a state, and is an example of a second category in the present modification.

(12) Although the above embodiment has been described with a whitelist, the frequency of change of field values (occurrence frequency of change), and the average and variance of the amount of change when field values change, as behavior information in a normal model, this is not restrictive. For example, an upper limit or lower limit indicating a range of normal values for each of the features may be stored. Also, a maximum value and minimum value of the amount of change when the field values change may be stored. Also, a whitelist of transition of values when the field values change may be stored. Also, parameters for when applying to a time-sequence model may be stored. Also, a greatest value of the occurrence frequency of change of values per predetermined time (e.g., one second) may be calculated from records in the reception log and stored. This gives more methods for anomaly detection processing, enabling anomalies to be caught by a greater number of techniques.

(13) Although description has been made regarding the above embodiment that, for behavior information in the normal model, the average and variance of the amount of change when the values change is stored with regard to a continuous value field, and the rate of field values changing is stored with regard to a status field, this combination is not imperative.

(14) Although category and behavior information were stored for each field as a normal model in the above-described embodiment, behavior information may be stored for multiple fields. For example, data yielded by subjecting fields obtained by splitting a data field to principal component analysis, or dimensionality reduction processing such as AutoEncoder, may be stored as a normal model. Accordingly, normal models are generated which capture relationship between fields, which is more effective than simple anomaly detection by fields in some cases.

(15) One condition for extracting a checksum at the payload splitting unit in the above-described embodiment was that, of the remaining splitting pattern candidates, the field length being four bits or eight bits is a condition, but other values may be used. Particularly, in a case where the length of the checksum field is known beforehand, that value can be set. In a case where it is not known beforehand, setting to an often-used length enables fields to be split with good precision.

(16) One condition for extracting a checksum at the payload splitting unit in the above-described embodiment was that an extracted record includes that where all values that can be expressed by the bit length of the splitting pattern candidates, but this condition is not imperative. For example, a field appearing to be random may be checked. This processing is effective in a case a Message Authentication Code is included, since the data field can be precisely split. In a case where the checksum calculation method is known beforehand, the checksum field may be extracted by confirming whether the value of the splitting pattern candidate is the value calculated from the checksum calculation expression.

(17) Although the embodiment has been described above as three types being calculated for each splitting pattern when splitting a data field, these being the number of types of values observed (first feature), the frequency of change occurring in the value of a field as to the observation data count (second feature), and variance of the amount of change at the time of value change (third feature), but there is no need to calculate all of these three types of features. For example, if only extracting of a constant value field is desired, only the first feature has to be calculated, so the necessary feature can be selected for calculation depending on the field regarding which extracting is desired. Also, a separate feature that can be calculated from the above features may be used. For example, a feature regarding how many types of values have been observed for a range of values that can be assumed, which can be calculated from the first feature and the field length, may be used. This enables data field splitting processing to be simplified, which is advantageous from the perspective of processing time and program size.

(18) Although description has been made in the above embodiment that features are calculated without changing values of the data field for each splitting pattern when splitting the data field, pre-processing may be performed where data field values are converted. For example, assuming that a splitting pattern is an encoded field, features may be calculated upon having performed two's complement conversion processing. This is effective in splitting the data field with good precision in a case where a continuous value field is expressed with encoding.

(19) Although the payload splitting unit according to the above embodiment has been described as notifying information of the split data field to the feature extracting unit, whereby the feature extracting unit extracts a normal model, the output itself of the payload splitting unit may be externally notified or internally saved.

(20) Although the payload splitting unit according to the above embodiment has been described as performing data field splitting processing on all IDs included in a reception log, data field splitting processing does not have to be performed on all IDs. For example, an arrangement may be made where data field splitting processing is performed only regarding IDs specified beforehand.

(21) Although the payload splitting unit according to the above embodiment has been described as splitting data fields by extracting features regarding all splitting pattern candidates, data field splitting processing may be performed only on a range decided beforehand. This enables high-speed processing in a case where high-speed feature extracting from a large data field region is desired, by narrowing down the object of monitoring. For example, data field splitting processing may be performed only regarding the higher-order 20 bits of the data field, or may be performed on an optional range. This is effective from the perspective of processing time.

(22) Although variance in the amount of change at the time of change of values has been used as a feature to capture the time-sequence change of change in the field in the above-described embodiment, other features may be used. For example, the distribution of the amount of change in field values may be used, or a feature using the running average of field values may be used.

(23) The CAN protocol has been used as the onboard network in the above-described embodiments, but this is not restrictive. For example, CAN-FD (CAN with Flexible Data Rate), FlexRay, Ethernet, LIN (Local Interconnect Network), MOST (Media Oriented Systems Transport), and so forth, may be used. Further, sub-networks using these networks may be combined for the network.

(24) The devices in the above embodiments each specifically are computer systems configured of a microprocessor, ROM, RAM, hard disk unit, display unit, keyboard, mouse, and so forth. A computer program is recorded in the RAM or hard disk unit. The devices achieve their functions by the microprocessor operating in accordance with the computer program. Now, a computer program is configured by multiple sets of command codes instructing the computer being combined to achieve predetermined functions.

(25) Part or all of the components configuring the devices in the above-described embodiment may be configured as a single system LSI (Large Scale Integration). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program.

The parts of the components making up the above devices may be individually formed into one chip, or part or all may be included in one chip.

Also, while description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. An FPGA (Field Programmable Gate Array) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(26) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(27) The present disclosure may be the method described above. The present disclosure also may be a computer program which realizes the method by a computer, or may be digital signals made up of the computer program.

The present disclosure also may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums.

The present disclosure may also be an arrangement where the computer program or the digital signals are transmitted over an electric communication line, wireless or cable communication line, a network of which the Internet is representative, data broadcasting, or the like.

Also, the present disclosure may be a computer system having a microprocessor and memory, where the memory records the computer program, and the microprocessor operates according to the computer program.

The program or the digital signals may be recorded in the recording medium and transported, or the program or the digital signals may be transported over the network or the like, and thereby be executed by another computer system that is independent.

(28) Combinations of the above embodiment and the above modifications may be made.

While the above embodiment has been described with reference to cyber security countermeasures in an in-vehicle network installed in an automobile, the applicable field is not limited thereto. The above embodiment may be applied to vehicles, such as construction machines, farm machines, watercraft, railed vehicles, and aircraft, in addition to automobiles. That is, the above-described embodiment can be applied to a vehicle network and a vehicle network system as cyber security countermeasures. Furthermore, the above embodiment may be applied to communication networks used in industrial control systems in, for example, factories and buildings or communication networks for controlling embedded devices.

The present disclosure monitors data frames flowing over the onboard network, splits data fields included in data frames in accordance with statistical features, and generates normal models for each of the split fields. The monitoring ECU can also detect unauthorized activity on the onboard network based on the normal models. Thus, individual design beforehand is unnecessary even in different onboard network systems, thereby enabling protection of onboard networks with suppressed costs.

What is claimed is:

1. An information processing method of processing data frames flowing over an onboard network including one or more electronic control units that is carried out by an information processing system having a storage unit, the information processing method comprising:

frame collecting, of receiving a plurality of the data frames flowing over the onboard network, obtaining, from each of the multiple data frames, a payload included in the data frame and configured of at least one field, and recording in a reception log stored in the storage unit as one record;

field extracting, of calculating, regarding each of a plurality of payload splitting pattern candidates indicating different regions within payloads of the plurality of data frames, one or more features relating to time-sequence change of values of the payload in the region, from the plurality of records, selecting, from the plurality of payload splitting pattern candidates, a payload splitting pattern indicating a region of a field within the payload, based on the features, and outputting field extracting results indicating the region indicated by the selected payload splitting pattern, and a category of the field based on the features; and feature extracting, executed by the information processing system, in which a normal model, indicating a normal range of change of values in a field indicated by the selected payload splitting pattern, is generated from the field extracting results and the reception log, based on statistical information relating to the amount of change in time-sequence change of values of this field, and the generated normal model is output.

2. The information processing method according to claim 1, wherein the reception log further includes information indicating an order in which the plurality of records have been received, wherein the features include at least one of a first feature representing a count of patterns of the time-sequence change, a second feature representing an occurrence frequency of the time-sequence change, and a third feature representing statistical information relating to an amount of change of the time-sequence change.

3. The information processing method according to claim 2, wherein the features include the second feature and the third feature, and wherein the information processing system executes continuous value field extracting, of selecting, from the plurality of payload splitting pattern candidates, a payload splitting pattern indicating a region of a field of a continuous value category where the value of the payload indicates a physical quantity, based on the second feature and the third feature, thereby selecting the payload splitting pattern indicating the field of the first category.

4. The information processing method according to claim 3, wherein, in the field extracting, the information processing system calculates, for each of the plurality of payload splitting pattern candidates, an outlier value score indicating a degree of outlying of the third feature out of the payload splitting pattern candidates indicating a region of the same data length, calculates an average value of the outlier value score of payload splitting pattern candidates, indicating a region of which a start bit is the same in the payload splitting pattern candidates, and selects, out of the payload splitting pattern candidates indicating a region where the average value is a predetermined threshold value or above, a payload splitting pattern indicating a region of a field corresponding to the continuous value category, based on a magnitude relation of the second feature of the payload splitting pattern candidate included in the payload splitting pattern candidates.

5. The information processing method according to claim 3, wherein, in the field extracting, the information processing system selects, from the plurality of payload splitting pattern candidates, a payload splitting pattern that is a region that exhibits change each time in the value of the payload, and where the amount of change of each value of the payload is constant each time, as a payload splitting pattern indicating a region of a field of a counter category, based on the features, thereby selecting the payload splitting pattern indicating a field of the first category.

6. The information processing method according to claim 5,
wherein, in the field extracting, the information processing system
selects a payload splitting pattern candidate that exhibits time-sequence change in the value of the payload one time or more, and that indicates a region where the value of the payload assumes a discrete value, as the payload splitting pattern indicating a region of a field of the second category, based on the features.

7. The information processing method according to claim 6,
wherein the second category is at least one of
a checksum category to check consistency of the value of the payload within the field, and
a status category where the value of the payload within the field indicates a predetermined state of a vehicle including the onboard network.

8. The information processing method according to claim 6,
wherein, in the field extracting, the information processing system executes
constant value field extracting,
counter field extracting,
the continuous value field extracting, and
second category field extracting,
wherein, in the constant value field extracting, a payload splitting pattern candidate where the first feature is 1 is selected from the plurality of payload splitting pattern candidates as a payload splitting pattern indicating a region of a field of the constant value category, the payload splitting pattern candidates out of the plurality of payload splitting pattern candidates of which at least part overlap this selected payload splitting pattern are excluded, and the remainder are taken as first payload splitting patterns,
wherein, in the counter field extracting, a payload splitting pattern indicating a region of a field of the counter category is selected from the first payload splitting pattern candidates, the payload splitting pattern candidates out of the first payload splitting pattern candidates of which at least part overlap this selected payload splitting pattern are excluded, and the remainder are taken as second payload splitting pattern candidates,
wherein, in the continuous value field extracting, a payload splitting pattern indicating a region of a field of the continuous value category is selected from the second payload splitting pattern candidates, using the second feature and the third feature, the payload splitting pattern candidates out of the second payload splitting pattern candidates of which at least part overlap this selected payload splitting pattern are excluded, and the remainder are taken as third payload splitting pattern candidates,
and wherein, in the second category field extracting, the third payload splitting pattern candidates are selected as the second category field.

9. The information processing method according to claim 1,
wherein each of the plurality of data frames includes a data type ID indicating the type of data frame,
and wherein the information processing system
records the payload and the data type ID to the reception log as one record in the frame collecting, and executes the field extracting on data frames having the data type ID in common.

10. An information processing system of processing data frames flowing over an onboard network including one or more electronic control units, the information processing system comprising:
a processor; and
a storage unit that stores a reception log,
wherein the processor
receives a plurality of the data frames flowing over the onboard network, obtains, from each of the plurality of data frames, a payload included in the data frame and configured of at least one field, and records in the reception log, stored in the storage unit, as one record,
calculates, regarding each of a plurality of payload splitting pattern candidates indicating different regions within payloads of the plurality of data frames, one or more features relating to time-sequence change of values of the payload in the region, from the plurality of records,
selects, from the plurality of payload splitting pattern candidates, a payload splitting pattern indicating a region of a field within the payload, based on the features,
outputs field extracting results indicating the region indicated by the selected payload splitting pattern, and a category of the field based on the features, and
extracts, in which a normal model, indicating a normal range of change of values in a field indicated by the selected payload splitting pattern, is generated from the field extracting results and the reception log, based on statistical information relating to the amount of change in time-sequence change of values of this field, and the generated normal model is output.

11. A non-transitory computer-readable recording medium storing a program that causes an information processing system, having a processor and a storage unit, to process data frames flowing over an onboard network including one or more electronic control units, wherein the program, when executed by the processor, causes the information processing system to perform the following:
frame collecting, of receiving a plurality of the data frames flowing over the onboard network, obtaining, from each of the multiple data frames, a payload included in the data frame and configured of at least one field, and recording in a reception log stored in the storage unit as one record;
field extracting, of calculating, regarding each of a plurality of payload splitting pattern candidates indicating different regions within payloads of the plurality of data frames, one or more features relating to time-sequence change of values of the payload in the region, from the plurality of records, selecting, from the plurality of payload splitting pattern candidates, a payload splitting pattern indicating a region of a field within the payload, based on the features, and outputting field extracting results indicating the region indicated by the selected payload splitting pattern, and a category of the field based on the features; and
feature extracting, executed by the information processing system, in which a normal model, indicating a normal range of change of values in a field indicated by the selected payload splitting pattern, is generated from the field extracting results and the reception log, based on statistical information relating to the amount of change in time-sequence change of values of this field, and the generated normal model is output.

\* \* \* \* \*